(12) United States Patent
Das et al.

(10) Patent No.: US 11,788,178 B2
(45) Date of Patent: Oct. 17, 2023

(54) METHODS OF MAKING HIGHLY-FORMABLE ALUMINUM ALLOYS AND ALUMINUM ALLOY PRODUCTS THEREOF

(71) Applicant: Novelis Inc., Atlanta, GA (US)

(72) Inventors: Sazol Kumar Das, Acworth, GA (US); Matthew Josef Heyen, Kennesaw, GA (US); ChangOok Son, Marietta, GA (US); Rashmi Ranjan Mohanty, Roswell, GA (US); Guillaume Florey, Veyras (CH)

(73) Assignee: Novelis Inc., Atlanta, GA (US)

( * ) Notice: Subject to any disclaimer, the term of this patent is extended or adjusted under 35 U.S.C. 154(b) by 898 days.

(21) Appl. No.: 16/518,348

(22) Filed: Jul. 22, 2019

(65) Prior Publication Data

US 2020/0023417 A1    Jan. 23, 2020

Related U.S. Application Data

(60) Provisional application No. 62/701,977, filed on Jul. 23, 2018, provisional application No. 62/810,585, filed on Feb. 26, 2019.

(51) Int. Cl.
*C22C 21/02* (2006.01)
*C22F 1/043* (2006.01)
(Continued)

(52) U.S. Cl.
CPC ............ *C22F 1/043* (2013.01); *B21B 1/22* (2013.01); *B21B 3/00* (2013.01); *C22C 21/02* (2013.01);
(Continued)

(58) Field of Classification Search
CPC ..................................................... C22C 21/02
See application file for complete search history.

(56) References Cited

U.S. PATENT DOCUMENTS 4,174,232 A    11/1979  Lenz et al.
4,260,419 A     4/1981  Robertson
(Continued)

FOREIGN PATENT DOCUMENTS

CN    102168213    8/2011
CN    104080934    10/2014
(Continued)

OTHER PUBLICATIONS

Japanese Application No. 2021-503544, Office Action, dated Mar. 8, 2022, 11 pages.
(Continued)

*Primary Examiner* — Jophy S. Koshy
(74) *Attorney, Agent, or Firm* — Kilpatrick Townsend & Stockton LLP

(57) ABSTRACT

Provided herein are highly-formable aluminum alloys and methods of making such alloys. The method of preparing aluminum alloys described herein can include a low final cold reduction step and/or an optional inter-annealing step to produce randomly distributed crystallographic texture components that produce an isotropic aluminum alloy product exhibiting improved formability and deep drawability. The methods described herein result in aluminum alloy microstructures having a balance of alpha fibers and beta fibers that promote improved formability of aluminum alloy sheets. The resulting improvements in quality allow for shaping processes with reduced rates of spoilage.

10 Claims, 5 Drawing Sheets

(51) Int. Cl.
    *B21B 1/22*        (2006.01)
    *B21B 3/00*        (2006.01)
(52) U.S. Cl.
    CPC ... *B21B 2001/225* (2013.01); *B21B 2003/001* (2013.01)

(56) References Cited

U.S. PATENT DOCUMENTS

| | | | |
|---|---|---|---|
| 5,344,507 | A | 9/1994 | Masumoto et al. |
| 6,117,252 | A | 9/2000 | Barlat et al. |
| 6,503,446 | B1 | 1/2003 | Ren et al. |
| 7,472,740 | B2 | 1/2009 | Anderson et al. |
| 7,748,434 | B2 | 7/2010 | Wagstaff |
| 8,927,113 | B2 | 1/2015 | Anderson et al. |
| 10,280,495 | B2* | 5/2019 | Kokubo ............... C22F 1/04 |
| 10,533,243 | B2 | 1/2020 | Newman et al. |
| 10,550,455 | B2 | 2/2020 | Hosch et al. |
| 2002/0034454 | A1 | 3/2002 | Fujita et al. |
| 2005/0011630 | A1 | 1/2005 | Anderson et al. |
| 2005/0028894 | A1 | 2/2005 | Hoffmann et al. |
| 2008/0041501 | A1 | 2/2008 | Platek et al. |
| 2009/0214891 | A1 | 8/2009 | Lahaye |
| 2010/0129683 | A1 | 5/2010 | Lin et al. |
| 2010/0279143 | A1 | 11/2010 | Kamat et al. |
| 2010/0316887 | A1 | 12/2010 | Dwenger |
| 2013/0068352 | A1 | 3/2013 | Siles et al. |
| 2013/0302642 | A1 | 11/2013 | Ren |
| 2014/0193666 | A1 | 7/2014 | Brinkman et al. |
| 2014/0322558 | A1 | 10/2014 | Takeda et al. |
| 2014/0356647 | A1 | 12/2014 | Takeda et al. |
| 2015/0213914 | A1 | 7/2015 | Sekiya et al. |
| 2015/0217813 | A1 | 8/2015 | Smeyers et al. |
| 2015/0224556 | A1 | 8/2015 | Brinkman et al. |
| 2016/0002761 | A1 | 1/2016 | De Smet |
| 2016/0201158 | A1 | 7/2016 | Kamat et al. |
| 2017/0044649 | A1 | 2/2017 | Selepack |
| 2017/0106919 | A1 | 4/2017 | Florey et al. |
| 2017/0283913 | A1 | 10/2017 | Koshino et al. |
| 2018/0122528 | A1 | 5/2018 | Yoshida et al. |
| 2019/0330716 | A1 | 10/2019 | Kuramoto et al. |
| 2019/0376165 | A1* | 12/2019 | Wen ................. C22F 1/047 |
| 2020/0024713 | A1 | 1/2020 | Das et al. |

FOREIGN PATENT DOCUMENTS

| | | |
|---|---|---|
| CN | 104080935 | 10/2014 |
| CN | 107109547 | 8/2017 |
| EP | 0272528 | 6/1988 |
| EP | 2055473 | 5/2009 |
| EP | 2156945 | 2/2010 |
| EP | 2570257 | 3/2013 |
| EP | 2592165 B1 | 9/2014 |
| EP | 3299482 | 3/2018 |
| EP | 3827107 | 6/2021 |
| EP | 3827108 | 6/2021 |
| FR | 2826979 | 1/2003 |
| JP | 512547 | 10/1976 |
| JP | 55161043 | 12/1980 |
| JP | 62158032 | 7/1987 |
| JP | 565582 | 3/1993 |
| JP | 05125472 | 5/1993 |
| JP | 5171324 | 7/1993 |
| JP | 0754088 | 2/1995 |
| JP | 08260086 | 10/1996 |
| JP | 10265881 | 10/1998 |
| JP | 1171623 | 3/1999 |
| JP | 2002362046 | 12/2002 |
| JP | 2002363046 | 12/2002 |
| JP | 2004526061 | 8/2004 |
| JP | 2005238737 | 9/2005 |
| JP | 2006219763 | 8/2006 |
| JP | 2007516344 | 6/2007 |
| JP | 2009249727 | 10/2009 |
| JP | 2010189730 | 9/2010 |
| JP | 2011530657 | 12/2011 |
| JP | 5388157 | 1/2014 |
| JP | 2014040659 | 3/2014 |
| JP | 2014529687 | 11/2014 |
| JP | 2015071823 | 4/2015 |
| JP | 6039351 | 11/2016 |
| JP | 2017179468 | 10/2017 |
| KR | 20140063818 | 5/2014 |
| KR | 20140092901 A | 7/2014 |
| KR | 20180021367 A | 3/2018 |
| WO | 9713882 | 4/1997 |
| WO | 02090609 | 11/2002 |
| WO | 2013037918 | 3/2013 |
| WO | 2013065761 | 5/2013 |
| WO | 2014128023 | 8/2014 |
| WO | 2014135367 | 9/2014 |
| WO | 2014155818 | 10/2014 |
| WO | 2018011069 | 1/2018 |
| WO | 2019010284 | 1/2019 |
| WO | 2020023367 | 1/2020 |

OTHER PUBLICATIONS

Chinese Application No. 201980062018.5 , Office Action, dated Mar. 18, 2022, 14 pages.
European Application No. 19749140.0 , Office Action, dated Mar. 21, 2022, 4 pages.
"International Alloy Designations and Chemical Composition Limits for Wrought Aluminum and Wrought Aluminum Alloys", The Aluminum Association, Inc., Registration Record Series: Teal Sheets, Feb. 1, 2009, 35 pages.
"Precision Aluminum Plate Backer", Takach Press Corp., Available Online at https://www.takachpress.com/access/backer.htm, Nov. 20, 2019, 2 pages.
Bray , "Aluminum Mill and Engineered Wrought Products", ASM Handbook, vol. 2: Properties and Selection: Nonferrous Alloys and Special-Purpose Materials, ASM International, 1990, pp. 29-61.
Davis , "Aluminum and Aluminum Alloys", ASM International, 1993, 44 pages.
Nwambu et al., "Effect of Molybdenum and Cobalt Addition on Structure and Mechanical Properties of Aluminium—12.5% Silicon Alloy", International Journal of Engineering Science Invention, vol. 3, No. 4, Apr. 2014, pp. 20-24.
PCT/US2019/042797 , "International Search Report and Written Opinion", dated Sep. 23, 2019, 11 pages.
PCT/US2019/042809 , "International Search Report and Written Opinion", dated Sep. 23, 2019, 12 pages.
Sani et al., "Effect of Chromium and Cobalt Additions on the Corrosion Resistance of Aluminium Silicon Iron Alloy (Al—Si—Fe)", International Journal of Scientific & Engineering Research, vol. 3, Issue 12, Dec. 2012, pp. 1-10.
Sha et al., "Effects of Co addition on Fe-bearing intermetallic compounds and mechanical properties of Alsi20Cu2Ni1Fe0.7-1 alloys", Journal of Alloys and Compounds, vol. 551, 2013, pp. 468-474.
Sweet et al., "Hot Tear Susceptibility of Al—Mg—Si—Fe Alloys with Varying Iron Contents", Metallurgical and Materials Transactions A: Physical Metallurgy and Materials Science, vol. 44A, No. 12, Dec. 2013, pp. 5396-5407.
Chinese Application No. 201980062018.5, Office Action, dated Aug. 30, 2021, 20 pages.
Indian Application No. 202117002869, "First Examination Report", dated Jul. 13, 2021, 7 pages.
Canadian Application No. 3106316 , Office Action, dated Nov. 29, 2021, 3 pages.
Davis , "Chemical Compositions and International Designations", Metals Handbook Desk Edition, 2nd Edition, 1998, pp. 426-429.
Indian Application No. 201817012986 , "First Examination Report", dated Oct. 21, 2021, 8 pages.
Korean Application No. 10-2021-7003675 , Office Action, dated Dec. 29, 2021, 16 pages.
Canadian Application No. 3,106,316 , "Notice of Allowance", dated Sep. 8, 2022, 1 page.

(56) References Cited

OTHER PUBLICATIONS

European Application No. 19749140.0 , "Office Action", dated Aug. 23, 2022, 4 pages.
Chinese Application No. 201980062018.5 , "Office Action", dated Dec. 28, 2022, 6 pages.
Chinese Application No. 201980062018.5 , "Office Action", dated Jun. 17, 2022, 8 pages.
Japanese Application No. 2021-503544 , "Office Action", dated Sep. 6, 2022, 11 pages.
Korean Application No. 10-2021-7003675 , "Notice of Decision to Grant", dated Jun. 14, 2022, 5 pages.
European Application No. 19749140.0 , "Intention to Grant", dated May 2, 2023, 8 pages.

* cited by examiner

METHODS OF MAKING HIGHLY-FORMABLE ALUMINUM ALLOYS AND ALUMINUM ALLOY PRODUCTS THEREOF

CROSS-REFERENCE TO RELATED APPLICATIONS

The present application claims priority to and filing benefit of U.S. Provisional Patent Application No. 62/701,977, filed on Jul. 23, 2018, and U.S. Provisional Patent Application No. 62/810,585, filed on Feb. 26, 2019, which are each incorporated herein by reference in their entireties.

FIELD

The present disclosure relates to aluminum alloy products having microstructures that facilitate the shaping and forming of the aluminum alloy product. The present disclosure also relates to methods of making the aluminum alloy products.

BACKGROUND

Aluminum alloy sheets are increasingly replacing steel sheets for automobile parts to reduce the weight of automobiles while providing comparable mechanical properties, e.g., strength. However, by improving the strength of aluminum alloy sheets, the formability of these aluminum alloy sheets is often compromised. For example, the formability of high-strength aluminum alloy sheets may be insufficient because the plastic anisotropy of the aluminum alloy sheet is not controlled during the forming process. The forming process produces a crystallographic texture of an aluminum alloy that promotes plastic anisotropy and plays a critical role in the formability of the aluminum alloy.

Conventional processes for producing aluminum alloy sheets include a cold rolling step to obtain a product having a fully recrystallized grain structure. In most cases, aluminum alloy sheets are subjected to a high cold reduction in the final cold rolling step to produce the recrystallized grain structure. For example, the high cold reduction can be a cold work that results in greater than 70% reduction in thickness of the aluminum alloy sheet in the final cold rolling step (e.g., the cold rolling step that results in the final gauge aluminum alloy product). However, the high amount of cold reduction in the final cold rolling step produces an aluminum alloy microstructure having highly linear alpha fibers, e.g., aligned cube-texture components. An aluminum alloy sheet having highly linear alpha fibers results in an aluminum alloy sheet having anisotropic properties, for example, low Lankford coefficients (r-value), which results in roping, earing, etc. In this respect, optimizing and/or controlling the method of producing aluminum alloy products (e.g., aluminum alloy sheets) having isotropic properties is desirable.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein are highly-formable aluminum alloys and methods of producing the aluminum alloys. In one aspect, described are methods of preparing an aluminum alloy product. The method may comprise casting an aluminum alloy to produce a cast aluminum alloy article, homogenizing the cast aluminum alloy article to produce a homogenized cast aluminum alloy article, hot rolling the homogenized cast aluminum article to produce a hot rolled product, cold rolling the hot rolled product in a first cold rolling step to produce a first cold rolled product having an intermediate gauge, wherein the first cold rolling step results in an about 25% to about 70% reduction in thickness, cold rolling the first cold rolled product in a second cold rolling step to produce a final gauge aluminum alloy product, wherein the second cold rolling step results in an about 40% to about 70% reduction in thickness from the intermediate gauge. In some cases, the method optionally may further comprise inter-annealing the first cold rolled product. The inter-annealing step may be performed at an inter-annealing temperature of from about 300° C. to about 450° C. In some cases, the intermediate gauge comprises a thickness ranging from about 2 mm to about 6 mm. In some cases, the method further comprises solution heat treating the final gauge aluminum alloy product. In some cases, the final gauge aluminum alloy product comprises a thickness ranging from about 0.1 mm to about 3 mm. In some cases, the casting step comprises direct chill casting or continuous casting. In some cases, the homogenizing step is performed at a homogenization temperature of from about 450° C. to about 600° C. In some cases, the hot rolling step is performed at a hot rolling temperature of from about 500° C. to about 560° C.

In some cases, a volume fraction of alpha fibers in the final gauge aluminum alloy product comprises at least about 8%. In some cases, a volume fraction of beta fibers in the final gauge aluminum alloy product comprises at least about 6%. In some cases, a ratio of the volume fraction of the alpha fibers to the volume fraction of the beta fibers in the aluminum alloy product ranges from about 0.5:1 to 2:1. In some cases, the final gauge aluminum alloy product is isotropic. In some cases, the final gauge aluminum alloy product exhibits a yield strength of at least about 5% greater than a yield strength of an aluminum alloy prepared by a method including a final cold rolling step that results in greater than 70% reduction in thickness from the intermediate gauge aluminum alloy to the final gauge aluminum alloy. In some cases, the final gauge aluminum alloy product has an ultimate tensile strength of at least about 3% greater than an ultimate tensile strength of an aluminum alloy prepared by a method including a final cold rolling step that results in greater than 70% reduction in thickness from the intermediate gauge aluminum alloy to the final gauge aluminum alloy. In some cases, the final gauge aluminum alloy product has a total elongation of at least about 5% greater than a total elongation of an aluminum alloy prepared by a method including a final cold rolling step that results in greater than 70% reduction in thickness from the intermediate gauge aluminum alloy to the final gauge aluminum alloy.

In some cases, the aluminum alloy comprises about 0.5 to 2.0 wt. % Si, 0.1 to 0.4 wt. % Fe, up to 0.4 wt. % Cu, up to 0.5 wt. % Mg, 0.02 to 0.1 wt. % Mn, up to 0.02 wt. % Cr, up to 0.15 wt. % Ti, up to 0.1 wt. % Zn, up to 0.15 wt. % impurities, and Al. In some cases, the aluminum alloy comprises about 0.7 to 1.4 wt. % Si, 0.1 to 0.3 wt. % Fe, up to 0.2 wt. % Cu, up to 0.4 wt. % Mg, 0.02 to 0.08 wt. % Mn, up to 0.015 wt. % Cr, up to 0.05 wt. % Ti, up to 0.1 wt. % Zn, up to 0.15 wt. % impurities, and Al. In some cases, the aluminum alloy comprises about 1.0 to 1.4 wt. % Si, 0.12 to 0.20 wt. % Fe, up to 0.15 wt. % Cu, up to 0.35 wt. % Mg, 0.04 to 0.08 wt. % Mn, 0.01 to 0.02 wt. % Cr, up to 0.02 wt. % Ti, up to 0.04 wt. % Zn, up to 0.15 wt. % impurities, and Al. In some cases, the final gauge aluminum alloy product is an automobile body part.

Described herein are highly-formable aluminum alloys comprising about 0.5 to 2.0 wt. % Si, 0.1 to 0.4 wt. % Fe, up to 0.4 wt. % Cu, up to 0.5 wt. % Mg, 0.02 to 0.1 wt. % Mn, up to 0.02 wt. % Cr, up to 0.15 wt. % Ti, up to 0.1 wt. % Zn, up to 0.15 wt. % impurities, and Al, wherein the aluminum alloy microstructure comprises a volume fraction of beta fibers of at least about 6%. In some cases, a volume fraction of alpha fibers in the aluminum alloy microstructure comprises at least about 8%. In some cases, a ratio of the volume fraction of the alpha fibers to the volume fraction of the beta fibers in the aluminum alloy ranges from about 0.5:1 to 2:1. In some cases, the aluminum alloy is isotropic. In some cases, the aluminum alloy comprises a final gauge thickness ranging from about 0.1 mm to about 3 mm.

DETAILED DESCRIPTION

Figure 1A:
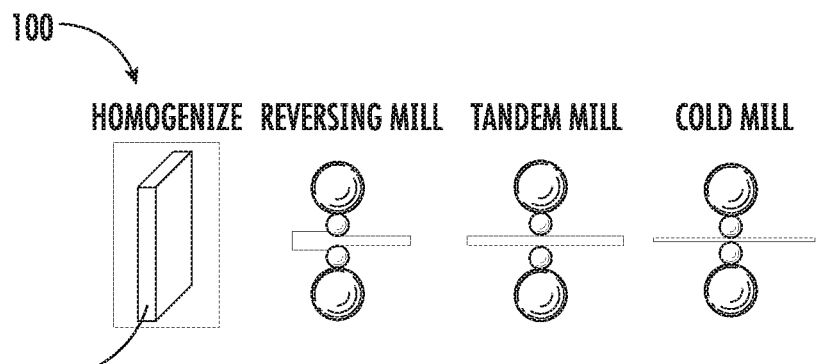
FIG. 1A is a schematic depicting a processing method having high final cold reduction.

Described herein are methods of preparing aluminum alloy sheets having aluminum microstructures specifically adapted for producing highly-formed aluminum alloy products. The resulting aluminum alloy products have a desirable microstructure that limits plastic anisotropy for improved formability and deep drawability. In some non-limiting examples, the methods of preparing highly-formable aluminum alloy sheets include a low final cold reduction step that produces a desirable crystallographic texture in the microstructure of the aluminum alloy product, e.g., final gauge aluminum alloy product. In some cases, low final cold reduction may refer to cold work that results in about a 70% or less reduction in gauge thickness from the intermediate gauge of the aluminum alloy sheet to the final gauge in the final cold rolling step, e.g., the last cold rolling step.

The methods described herein produce an aluminum alloy product having a volume fraction of various crystallographic texture components that limits plastic anisotropy. The aluminum alloy products prepared according to the methods described herein may have microstructures with a balance of alpha fibers and beta fibers that are randomly distributed, resulting in isotropic properties. Conventionally, the final cold reduction step results in greater than about a 70% reduction in gauge thickness causing alpha fibers, e.g., cube texture components, to align in a linear orientation. The aligned alpha fibers create linearity in the aluminum alloy microstructure thereby resulting in anisotropic behavior. Without being bound to any particular theory, it is believed that including a low final cold reduction step produces randomly distributed texture components, e.g., a balance of alpha fibers and beta fibers, that exhibit isotropic behavior. The random distribution of texture components result in isotropic properties and formability in all directions. Because of the random distribution of texture components, the resulting texture components do not align to create linearity that would produce anisotropic behavior. The resulting aluminum alloy products show improved quality and consistency in the production of highly-shaped products and also exhibit isotropic properties.

Aluminum alloys with microstructures that have a random distribution of texture components improve quality and consistency in the production of complex and highly-formed products. The random distribution of texture components also tends to improve the performance of an aluminum or aluminum alloy blank when it is formed into a finished product. Additionally, aluminum alloy microstructures that have texture components with reduced linearity, e.g., less aligned cube-texture components, also improve formability and performance of aluminum alloy products. Tailored microstructures may be used to improve formability of an aluminum alloy product without reducing the strength or otherwise weakening the material. In some cases, the highly-formable aluminum alloys prepared from the methods described herein are particularly useful for producing automobile parts and/or high recycled content aluminum alloys.

In general, conventional methods of producing aluminum alloy sheets result in microstructures that have high directionality (e.g., a surface that deforms differently in one or more directions of strain) in part due to high final cold reduction of the aluminum alloy sheet. For example, aluminum alloy sheets may undergo greater than 70% final cold reduction, e.g., between 71% and 99%, in order to obtain a fully recrystallized grain structure. The high amount of final cold reduction produces an aluminum alloy sheet having alpha fibers with increased linearity, resulting in an aluminum alloy having anisotropic properties. Inconsistent properties of the aluminum alloy cause increased waste and a reduction in production efficiency by requiring extra trimming and processing steps. If the r-value, being an index of anisotropy, is close to 0, strain is uniform in all directions, and thus isotropic properties are present. Therefore, it is necessary to properly maintain the r-value during a drawing process.

As detailed in the methods described herein, by appropriately controlling the method of producing an aluminum alloy sheet by having a: 1) low final cold reduction step and/or 2) intermediate annealing step (also referred to herein as an inter-annealing step) prior to final cold reduction, the crystallographic texture of the aluminum alloy sheet can be optimized to improve formability and drawability properties. More specifically, the aluminum alloy products resulting from the methods described herein have a microstructure with a relatively higher proportion of beta fibers, as well as a higher proportion of alpha fibers with reduced linearity (e.g., less aligned cube texture components), compared to processes for preparing aluminum alloy sheets with high final cold reduction and/or without an inter-annealing step. The random distribution of alpha fibers and beta fibers in the microstructure produces aluminum alloy sheets with excellent deep drawability and/or with high forming limits. These aluminum alloy sheets can be used for automotive parts and the like.

In some cases, the content of alloying elements in combination with the method of preparing and processing the aluminum alloy sheet produce aluminum alloy sheets having isotropic properties. Specifically, the aluminum alloy sheets formed according to the methods described herein have high volume fractions of beta fibers (e.g., a Brass component, an S component, and/or a Copper component). It was found that, among other things, low final cold reduction limits the amount of stored energy in the aluminum alloy sheet, which preferentially favors beta fiber formation. Additionally, due to the lower amount of stored energy from lower final cold work reduction, alpha fibers with reduced linearity are formed in the aluminum alloy sheet after solution heat treatment. Therefore, higher amounts of beta fibers and alpha fibers (with reduced linearity) are formed after solution heat treatment, producing a more randomized microstructure.

Further, the aluminum microstructures produced from the methods described herein have relatively higher proportions of beta fibers that tend to promote high r-values compared to processes for preparing aluminum alloy sheets with high final cold reduction and/or without an inter-annealing step. Additionally, the aluminum microstructures produced from the methods described herein comprise alpha fibers having less linearity compared to alpha fibers prepared with high final cold reduction. For example, less linearity may refer to texture components that are not aligned in their preferred linear texture alignment. These improved formability characteristics give better consistency of production and a lower spoilage rate for highly-shaped aluminum products during shaping of the aluminum alloy sheet. The resulting improvements in quality, consistency, and efficiency make high-speed commercial manufacture more reliable and economically feasible. Notably, aluminum microstructures produced from the methods described herein have an increased Lankford coefficient (as quantified by the r-value). The r-value is the ratio of thinning along the stress direction to thinning perpendicular to the stress direction while a material is under load. Aluminum alloys having a high r-value exhibit uniform deformation, e.g., stretching, in all directions thereby resulting in better formability. Additionally, the high r-value of the aluminum alloy indicates that the material is more isotropic and/or less linear. The result is lower instability and fewer stress concentrations that may lead to premature failure of the material. The proper balance of various texture components as described herein may reduce the variation of the r-value.

In some cases, the method of making aluminum alloy sheets includes an inter-annealing step that also contributes to forming a random distribution of texture components and limits shear deformation or more favorable texture orientation on the same rotation. In other words, the inter-annealing step produces a balance of alpha fibers and beta fibers, free from linearity of a preferred texture alignment, and in turn reduces roping in the final product. The reduced linearity of texture components in the aluminum alloy microstructure results in aluminum alloy products having high r-values, thereby forming an isotropic grain microstructure (lower anisotropy).

Definitions and Descriptions

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

As used herein, the term "alpha fibers" refers to Cube and Goss texture components.

As used herein, the term "beta fibers" refers to Brass, S, and Copper texture components.

As used herein, the terms Cube, Goss, rotated Goss, Brass, S, and Copper refer to different texture components of the microstructure of an aluminum alloy. These texture components are known in the art to refer to specific orientations of crystal lattices or polycrystals within the Euler space of the bulk aluminum alloy as described by Bunge's Convention. Under Bunge's Convention, the orientation of a crystal lattice or polycrystal within the Euler space may be described relative to reference axes with three Euler angles ($\varphi_1$, $\Phi$, $\varphi_2$) that represent the following rotations: a first rotation $\varphi_1$ about the Z-axis; a second rotation $\Phi$ about the rotated X-axis; and a third rotation $\varphi_2$ about the rotated Z-axis. With regard to rolling a metal product, such as a sheet or plate, the rolling direction (RD) is parallel to the X-axis, the transverse direction (TD) is parallel to the Y-axis, and the normal direction (ND) is parallel to the Z-axis. Each named texture component may be defined by its particular set of Euler angles ($\varphi_1$, $\Phi$, $\varphi_2$) or range of Euler angles ($\varphi_1$, $\Phi$, $\varphi_2$) in the Euler space.

In this description, reference is made to alloys identified by aluminum industry designations, such as "series" or "6xxx." For an understanding of the number designation system most commonly used in naming and identifying aluminum and its alloys, see "International Alloy Designations and Chemical Composition Limits for Wrought Aluminum and Wrought Aluminum Alloys," or "Registration Record of Aluminum Association Alloy Designations and Chemical Compositions Limits for Aluminum Alloys in the Form of Castings and Ingot," both published by The Aluminum Association.

As used herein, the meaning of "a," "an," or "the" includes singular and plural references unless the context clearly dictates otherwise.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm (e.g., less than 3 mm, less than 2 mm, less than 1 mm, less than 0.5 mm, less than 0.3 mm, or less than 0.1 mm). For example, a sheet may have a thickness of about 0.1 mm, about 0.2 mm, about 0.3 mm, about 0.4 mm, about 0.5, about 0.6 mm about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.1 mm, about 2.2 mm, about 2.3 mm, about 2.4 mm, about 2.5 mm, about 2.6 mm about 2.7 mm, about 2.8 mm, about 2.9 mm, about 3 mm, about 3.1 mm, about 3.2 mm, about 3.3 mm, about 3.4 mm, about 3.5 mm, about 3.6 mm, about 3.7 mm, about 3.8 mm, or about 3.9 mm.

As used herein, formability refers to the ability of a material to undergo deformation into a desired shape without fracturing, tearing-off, necking, earing or shaping errors such as wrinkling, spring-back, or galling occurring. In engineering, formability may be classified according to deformation modes. Examples of deformation modes include: drawing, stretching, bending, and stretch-flanging.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An 0 condition or temper refers to an aluminum alloy after annealing. A Ti condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy that is solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked. A W condition or temper refers to an aluminum alloy after solution heat treatment.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

As used herein, terms such as "cast aluminum alloy article," "cast metal article," "cast article," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method, or any combination thereof.

All ranges disclosed herein are to be understood to encompass both endpoints and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

The following aluminum alloys are described in terms of their elemental composition in weight percentage (wt. %) based on the total weight of the alloy. In certain examples of each alloy, the remainder is aluminum, with a maximum wt. % of 0.15% for the sum of the impurities.

Methods of Making Aluminum Alloy Products

Described herein are novel methods for preparing aluminum alloy products that exhibit desirable mechanical properties. Among other properties, the methods of preparing aluminum alloys as described herein result in aluminum alloy products that display excellent elongation and forming properties. In some cases, the mechanical properties can be achieved due to the method of processing the aluminum alloy. For example, the processing methods, as further described herein, include a low final cold reduction step, e.g., about 70% or less cold work reduction, and an optional intermediate annealing (i.e., inter-annealing) step. In some examples, a low final cold reduction may refer to cold work that results in from about 40% to less than about 70% reduction in gauge thickness of the aluminum alloy product in the final cold rolling step, e.g., the last cold rolling step. The low final cold reduction step and/or inter-annealing step produces an aluminum alloy microstructure having a more randomized texture, e.g., a random distribution of alpha fibers and beta fibers. In addition, the low final cold reduction step and/or inter-annealing step reduces the linearity of texture components, e.g., aligned cube texture components, giving a high r-value aluminum alloy product. The balance of alpha fibers and beta fibers, in turn, provides a more randomized microstructure, thus resulting in an aluminum alloy product having isotropic properties. The resulting aluminum alloy products exhibit desirable forming properties. In certain aspects, the method of preparing and processing the aluminum alloy products may influence or even determine whether the products will have properties adequate for a desired application.

Certain aspects and features of the present disclosure relate to crystallographic textures and/or microstructures of aluminum alloys that are particularly suited to the production of highly-formable products. The crystallographic texture of the aluminum alloy product (e.g., sheet), including the particular volume fractions of the texture components and the ratio of different fibers in the alloy microstructure, influences the formability of the aluminum alloy product as it is processed into a finished product. Aluminum alloys having the crystallographic texture described herein exhibit isotropic properties resulting in more uniform deformation of the aluminum alloy sheet.

Casting

The aluminum alloys, as further described herein, can be cast into a cast aluminum alloy article using any suitable casting method. For example, the casting process can include a direct chill (DC) casting process or a continuous casting (CC) process. In some non-limiting examples, the aluminum alloys for use in the casting step can be a primary material produced from raw materials (e.g., purified aluminum and additional alloying elements). In some further examples, the aluminum alloys for use in the casting step can be a recycled material, produced at least in part by aluminum scrap and optionally in combination with a primary material. In some cases, aluminum alloys for use in the casting step can contain at least about 40% of recycled content. For example, the aluminum alloy for use in the casting step can contain at least about 45%, at least about 50%, at least about 60%, at least about 70%, at least about 80%, at least about 90%, or at least about 95% of recycled content.

The cast aluminum alloy article can then be subjected to further processing steps. For example, the processing methods as described herein can include the steps of homogenizing, hot rolling, cold rolling, and/or solution heat treating to result in an aluminum alloy product.

Homogenization

The homogenization step as described herein was designed for the aluminum alloys described herein. The homogenization step can include heating the cast aluminum alloy to attain a temperature from about 450 to about 600° C. (e.g., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., or about 600° C.). For example, the cast aluminum alloy can be heated to a temperature of from about 500° C. to about 570° C. or from about 530° C. to about 570° C. In some embodiments, heating the cast aluminum alloy takes up to about 15 hours (e.g., from about 20 minutes to about 15 hours or from about 5 hours to about 10 hours, inclusively). For example, the cast aluminum alloy may be heated to a temperature of from about 450° C. to about 600° C. in about 20 minutes, about 30 minutes, about 45 minutes, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, or about 15 hours, or anywhere in between.

In some cases, the heating rate can be about 100° C./hour or less, 75° C./hour or less, 50° C./hour or less, 40° C./hour or less, 30° C./hour or less, 25° C./hour or less, 20° C./hour or less, or 15° C./hour or less. In other cases, the heating rate can be from about 10° C./min to about 100° C./min (e.g., from about 10° C./min to about 90° C./min, from about 10° C./min to about 70° C./min, from about 10° C./min to about 60° C./min, from about 20° C./min to about 90° C./min, from about 30° C./min to about 80° C./min, from about 40° C./min to about 70° C./min, or from about 50° C./min to about 60° C./min).

The cast aluminum alloy is then allowed to soak (i.e., held at the indicated temperature) for a period of time. According to one non-limiting example, the cast aluminum alloy is allowed to soak for up to about 15 hours (e.g., from about 20 minutes to about 15 hours or from about 5 hours to about 10 hours, inclusively). For example, the cast aluminum alloy can be soaked at a temperature of from about 450° C. to about 600° C. for about 20 minutes, about 30 minutes, about 45 minutes, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, or about 15 hours, or anywhere in between.

Hot Rolling

Following the homogenization step, a hot rolling step can be performed. In certain cases, the cast aluminum alloy articles are laid down and hot-rolled with an entry temperature range of about 500° C. to about 560° C. (e.g., from about 510° C. to about 550° C. or from about 520° C. to about 540° C.). The entry temperature can be, for example, about 505° C., 510° C., 515° C., 520° C., 525° C., 530° C., 535° C., 540° C., 545° C., 550° C., 555° C., 560° C., or anywhere in between. In certain cases, the hot roll exit temperature can range from about 200° C. to about 290° C. (e.g., from about 210° C. to about 280° C. or from about 220° C. to about 270° C.). For example, the hot roll exit temperature can be about 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., or anywhere in between.

In certain cases, the cast aluminum alloy article is hot rolled to an about 4 mm to about 15 mm gauge (e.g., from about 5 mm to about 12 mm gauge), which is referred to as a hot rolled product. For example, the cast article can be hot rolled to a 15 mm gauge, a 14 mm gauge, a 13 mm gauge, a 12 mm gauge, a 11 mm gauge, a 10 mm gauge, a 9 mm gauge, a 8 mm gauge, a 7 mm gauge, a 6 mm gauge, a 5 mm gauge, or a 4 mm gauge. The temper of the as-rolled hot rolled product is referred to as F-temper.

Coil Cooling

Optionally, the hot rolled product can be coiled into a hot rolled coil (i.e., an intermediate gauge aluminum alloy product coil or an intermediate coil) upon exit from the hot mill. In some examples, the hot rolled product is coiled into a hot rolled coil upon exit from the hot mill resulting in F-temper. In some further examples, the hot rolled product is cooled, e.g., air cooled. The cooling step can be performed at a rate of about 12.5° C./hour (° C./h) to about 3600° C./h. For example, the coil cooling step can be performed at a rate of about 12.5° C./h, 25° C./h, 50° C./h, 100° C./h, 200° C./h, 400° C./h, 800° C./h, 1600° C./h, 3200° C./h, 3600° C./h, or anywhere in between. In some still further examples, the cooled coil is stored for a period of time. In some examples, the intermediate coils are maintained at a temperature of about 100° C. to about 350° C. (for example, about 200° C. or about 300° C.).

Cold Rolling

Following the hot rolling step, a cold rolling step can be performed. In some examples, the cold rolling step is a two-stage cold rolling step. The two-stage cold rolling step can comprise a first cold rolling step, an optional intervening inter-annealing step, and a second cold rolling step. Optionally, the method can further comprise annealing the rolled product after the second cold rolling step. In certain aspects, the hot rolled products can be cold rolled to an intermediate gauge thickness in a first cold rolling step, i.e., into a first cold rolled product. In some examples, a first cold rolling step results in a reduction in thickness of the hot rolled product from about 30% to 70% (e.g., from about 30% to about 65%, from about 35% to about 65%, from about 45% to about 60%, or from about 50% to about 60%). For example, the first cold rolling step results in a reduction in thickness of the hot rolled product of about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, or about 70%.

In certain aspects, the hot rolled product is cold rolled to an intermediate gauge aluminum alloy product (e.g., a sheet or a shate) in the first cold rolling step. In some examples, the intermediate gauge aluminum alloy product has a thickness ranging from about 2 mm to 6 mm (e.g., from about 2.2 mm to about 5.8 mm, from about 2.4 mm to about 5.6 mm, from about 2.6 mm to about 5.4 mm, from about 2.8 mm to about 5.2 mm, from about 3 mm to about 5 mm, from about 3.2 mm to about 4.8 mm, from about 3.4 mm to about 4.6 mm, from about 3.6 mm to about 4.4 mm, from about 3.8 mm to about 4.2 mm, from about 4 mm to about 5 mm, from about 2.5 mm to about 3.5 mm, or from about 3 mm to about 4 mm). In some examples, the intermediate gauge aluminum alloy product has a thickness of about 6 mm or less, about 5.8 mm or less, about 5.6 mm or less, about 5.4 mm or less, about 5.2 mm or less, about 5 mm or less, about 4.8 mm or less, about 4.6 mm or less, about 4.4 mm or less, about 4.2 mm or less, about 4 mm or less, about 3.9 mm or less, about 3.8 mm or less, about 3.7 mm or less, about 3.6 mm or less, about 3.5 mm or less, about 3.4 mm or less, about 3.3 mm or less, about 3.2 mm or less, or about 3.1 mm or less.

A second cold rolling step can be performed on the intermediate gauge aluminum alloy product. In certain aspects, the second cold rolling step can be performed after an optional inter-annealing step (described below). In some examples, the second cold rolling step reduces the overall thickness of the first cold rolled product by about 50 to 70% (e.g., about 50% to about 60%, about 55% to about 65%, about 60% to about 70%, about 65% to about 70%, or about 60% to 65%). For example, the second cold rolling step results in a further reduction in thickness of the first cold rolled product of about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, or about 70%.

In certain aspects, the intermediate gauge aluminum alloy product is cold rolled to a final gauge aluminum alloy product (e.g., a sheet, such as a lower gauge sheet). In some examples, the final gauge aluminum alloy product has a thickness ranging from about 0.1 mm to 3 mm (e.g., from about 0.2 mm to about 2.9 mm, from about 0.3 mm to about 2.8 mm, from about 0.4 mm to about 2.7 mm, from about 0.5 mm to about 2.6 mm, from about 0.6 mm to about 2.5 mm, from about 0.7 mm to about 2.4 mm, from about 0.8 mm to about 2.3 mm, from about 0.9 mm to about 2.2 mm, from about 1 mm to about 2.1 mm, from about 1.1 mm to about 2.0 mm, from about 1.2 mm to about 1.9 mm, from about 1.3 mm to about 1.8 mm, from about 1.4 mm to about 1.7 mm, or from about 1.5 mm to about 1.6 mm). In some examples, the final gauge aluminum alloy product has a thickness of about 3 mm or less, about 2.8 mm or less, about 2.6 mm or less, about 2.4 mm or less, about 2.2 mm or less, about 2 mm or less, about 1.8 mm or less, about 1.6 mm or less, about 1.4 mm or less, about 1.2 mm or less, about 1 mm or less, about 0.9 mm or less, about 0.8 mm or less, about 0.7 mm or less, about 0.6 mm or less, about 0.5 mm or less, about 0.4 mm or less, about 0.3 mm or less, or about 0.2 mm or less.

The methods of preparing aluminum alloy sheets described herein include a low final cold reduction step that produces a desirable crystallographic texture in the microstructure of the aluminum alloy product. In some cases, low final cold reduction may refer to cold work that results in about a 70% or less reduction in gauge thickness from the intermediate gauge of the aluminum alloy sheet to the final gauge in the final cold rolling step, e.g., the last cold rolling step. For example, after a first cold rolling step that produces an intermediate gauge aluminum alloy product, the gauge of the intermediate gauge aluminum alloy product is reduced by about 70% or less in the final cold rolling step. In some cases, the final cold rolling step is a second cold rolling step. Because the final cold reduction is no more than 70%, the process produces an aluminum alloy product having a balanced volume fraction of beta fibers and alpha fibers (with reduced linearity) compared to processes with a high final cold reduction.

The low final cold reduction improves the average r-value of the aluminum alloy sheet product as compared to aluminum alloys that are prepared with a high final cold reduction and/or without inter-annealing, and thus improves formability in complex and highly-formed products. The aluminum alloy sheets prepared according to the methods described herein have higher total volume fractions of alpha fibers (with reduced linearity) and beta fibers than aluminum alloy sheets having a high final cold reduction (e.g., greater than 70% final cold reduction). By controlling the process conditions for preparing the aluminum alloy sheets, a desirable aluminum alloy microstructure having a random distribution of alpha fibers and beta fibers is achieved. Additionally, the higher volume fraction of beta fibers formed after solution heat treatment produces a more randomized microstructure in the aluminum alloy sheet which contributes to producing an alloy microstructure having isotropic properties.

Optional Inter-Annealing

In some non-limiting examples, an optional inter-annealing step can be performed during the two-stage cold rolling step. For example, the hot rolled product can be cold rolled to an intermediate gauge aluminum alloy product (first cold rolling step), optionally coiled, annealed, and subsequently cold rolled to a final gauge aluminum alloy product (second cold rolling step). In some aspects, the optional inter-annealing can be performed in a batch process (i.e., a batch inter-annealing step) or in a continuous process. The inter-annealing step can be performed at a temperature of from about 300° C. to about 450° C. (e.g., about 310° C., about 320° C., about 330° C., about 340° C., about 350° C., about 360° C., about 370° C., about 380° C., about 390° C., about 400° C., about 410° C., about 420° C., about 430° C., about 440° C., or about 450° C.).

In some cases, the heating rate in the inter-annealing step can be about 100° C./hour or less, 75° C./hour or less, 50° C./hour or less, 40° C./hour or less, 30° C./hour or less, 25° C./hour or less, 20° C./hour or less, or 15° C./hour or less. In other cases, the heating rate can be from about 10° C./min to about 100° C./min (e.g., from about 10° C./min to about 90° C./min, from about 10° C./min to about 70° C./min, from about 10° C./min to about 60° C./min, from about 20° C./min to about 90° C./min, from about 30° C./min to about 80° C./min, from about 40° C./min to about 70° C./min, or from about 50° C./min to about 60° C./min).

In some embodiments, the intermediate gauge aluminum alloy product is allowed to soak for a period of time during the inter-annealing step. According to one non-limiting example, the intermediate gauge aluminum alloy product is allowed to soak for up to about 5 hours (e.g., from about 30 minutes to about 4 hours, from about 45 minutes to about 3 hours, or from about 1 hour to about 2 hours, inclusively). For example, the intermediate gauge aluminum alloy product can be soaked at a temperature of from about 300° C. to about 450° C. for about 20 minutes, about 30 minutes, about 45 minutes, about 1 hour, about 1.5 hours, about 2 hours, about 3 hours, about 4 hours, about 5 hours, or anywhere in between.

Optionally, the intermediate gauge aluminum alloy product can be cooled, e.g., air cooled, after the inter-annealing step. The cooling step can be performed at a rate of about 5° C./hour (° C./h) to 20° C./h (e.g., from 6° C./h to 18° C./h, from 8° C./h to 15° C./h, or from 10° C./h to 14° C./h). For example, the coil cooling step can be performed at a rate of about 5° C./h, 6° C./h, 7° C./h, 8° C./h, 9° C./h, 10° C./h, 11° C./h, 12° C./h, 13° C./h, 14° C./h, 15° C./h, 16° C./h, 17° C./h, 18° C./h, 19° C./h, 20° C./h, or anywhere in between. In some examples, the cooled coil is cooled to room temperature. In some still further examples, the cooled coil is stored for a period of time.

The optional inter-annealing step can also improve the average r-value of the aluminum sheet product. The inter-annealing step also contributes to producing a more random distribution of texture components in the aluminum alloy microstructure and limits shear deformation, which, in turn, decreases linearity of the texture components (e.g., less linear cube-texture components) to avoid roping in the final product. The random distribution of texture components results in a high r-value. For example, the r-value at an angle to the rolling direction (e.g., 45°) can be at least 0.3, at least 0.4, at least 0.5, at least 0.6, at least 0.7, at least 0.8, or at least 0.9. The high r-values demonstrate the isotropic behavior of the aluminum alloy sheet.

Solution Heat Treating

A solution heat treating step can optionally be performed on the final gauge aluminum alloy product. The solution heat treating step can include heating the final gauge aluminum alloy product from room temperature to a peak metal temperature. Optionally, the peak metal temperature can be from about 530° C. to about 570° C. (e.g., from about 535° C. to about 560° C., from about 545° C. to about 555° C., or about 540° C.). The final gauge aluminum alloy product can soak at the peak metal temperature for a period of time. In certain aspects, the final gauge aluminum alloy product is allowed to soak for up to approximately 2 minutes (e.g., from about 10 seconds to about 120 seconds, inclusively). For example, the final gauge aluminum alloy product can be soaked at the temperature of from about 530° C. to about 570° C. for 10 seconds, 15 seconds, 20 seconds, 25 seconds, 30 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, 120 seconds, or anywhere in between. After solution heat treating, the final gauge aluminum alloy product can be quenched from the peak metal temperature at a rate of at least about 75° C. per second (° C./s). For example, the final gauge aluminum alloy product can be quenched at a rate of about 75° C./s, 100° C./s, 125° C./s, 150° C./s, 175° C./s, 200° C./s, or anywhere in between.

Optionally, the aluminum alloy product can then be naturally aged and/or artificially aged. In some non-limiting examples, the aluminum alloy product can be naturally aged to a T4 temper by storing at room temperature (e.g., about 15° C., about 20° C., about 25° C., or about 30° C.) for at least 72 hours. For example, the aluminum alloy product can be naturally aged for 72 hours, 84 hours, 96 hours, 108 hours, 120 hours, 132 hours, 144 hours, 156 hours, 168 hours, 180 hours, 192 hours, 204 hours, 216 hours, 240 hours, 264 hours, 288 hours, 312 hours, 336 hours, 360 hours, 384 hours, 408 hours, 432 hours, 456 hours, 480 hours, 504 hours, 528 hours, 552 hours, 576 hours, 600 hours, 624 hours, 648 hours, 672 hours, or anywhere in between.

Microstructure

The aluminum alloy products produced from the methods described herein include a microstructure having a plurality of crystallographic texture components. The crystallographic texture components can include alpha fibers (e.g., a Cube component and a Goss component) and beta fibers (e.g., a Brass component, an S component, and a Copper component). For example, the methods described herein result in an aluminum microstructure with high volume fractions of beta fibers and alpha fibers having reduced linearity that show improved quality and consistency in the production of highly-shaped products, thereby exhibiting isotropic properties.

In some examples, the aluminum alloy microstructure can include alpha fibers, e.g., one or more of a Cube component and a Goss component. Optionally, a volume fraction of the alpha fibers in the aluminum alloy microstructure can be at least about 8% (e.g., at least about 9%, at least about 10%, at least about 11%, at least about 12%, at least about 13%, at least about 14%, or at least about 15%). In some examples, the volume fraction of the alpha fibers in the aluminum alloy microstructure is up to about 20% (e.g., up to about 18%, up to about 16%, up to about 15%, up to about 14%, up to about 12%, or up to about 10%). For example, the volume fraction of the alpha fibers in the aluminum alloy microstructure may be about 0.1%, e.g., 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9%, 15.0%, 15.1%, 15.2%, 15.3%, 15.4%, 15.5%, 15.6%, 15.7%, 15.8%, 15.9%, 16.0%, 16.1%, 16.2%, 16.3%, 16.4%, 16.5%, 16.6%, 16.7%, 16.8%, 16.9%, 17.0%, 17.1%, 17.2%, 17.3%, 17.4%, 17.5%, 17.6%, 17.7%, 17.8%, 17.9%, 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, 19.9%, or 20.0%.

In some examples, the aluminum alloy microstructure can include beta fibers, e.g., one or more of a Brass component, an S component, and a Copper component. Optionally, a volume fraction of the beta fibers can be at least about 6% (e.g., at least about 6%, at least about 7%, at least about 8%, at least about 9%, at least about 10%, at least about 11%, at least about 12%, at least about 13%, at least about 14%, or at least about 15%). In some examples, the volume fraction of the beta fibers is up to about 20% (e.g., up to about 15% or up to about 10%). For example, the volume fraction of the beta fibers in the aluminum alloy microstructure can be about 0.1%, e.g., 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9%, 15.0%, 15.1%, 15.2%, 15.3%, 15.4%, 15.5%, 15.6%, 15.7%, 15.8%, 15.9%, 16.0%, 16.1%, 16.2%, 16.3%, 16.4%, 16.5%, 16.6%, 16.7%, 16.8%, 16.9%, 17.0%, 17.1%, 17.2%, 17.3%, 17.4%, 17.5%, 17.6%, 17.7%, 17.8%, 17.9%, 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, 19.9%, or 20.0%.

Aluminum alloys with microstructures having a relatively higher proportion of beta fibers exhibit improved formability and can be formed into complex and highly-shaped products. In addition, aluminum alloys with microstructures that have a relatively higher proportion of alpha fibers with reduced linearity can also improve formability compared to processes for preparing aluminum alloys with high final cold reduction and/or without an inter-annealing step. The resulting higher proportion of alpha fibers (with reduced linearity) and beta fibers also tends to improve the performance of an aluminum alloy blank when it is formed into a finished product.

In some cases, a ratio of the volume fraction of the alpha fibers to the volume fraction of the beta fibers in the aluminum alloy product ranges from about 0.5:1 to 2:1 (e.g., from about 0.6:1 to 1.9:1, from about 0.6:1 to 1.8:1, from about 0.7:1 to 1.7:1, from about 0.8:1 to 1.6:1, from about 0.9:1 to 1.5:1, from about 1:1 to 1.4:1, from about 1.1:1 to 1.3:1, or from about 1.2:1 to 1.5:1). In some examples, a ratio of the volume fraction of the alpha fibers to the volume fraction of the beta fibers in the aluminum alloy product is at least about 0.5:1, 0.6:1, 0.7:1, 0.8:1, 0.9:1, 1:1, 1.1:1, 1.2:1, 1.3:1, 1.4:1, 1.5:1, 1.6:1, 1.7:1, 1.8:1, 1.9:1, or 2:1.

The disclosed microstructures for the aluminum alloys facilitate the shaping and forming of aluminum alloy sheets into complex products. Aluminum alloy microstructures with specific amounts of randomly distributed beta fibers and alpha fibers show improved quality and consistency in the production of highly-shaped products. For example, the higher proportion of alpha fibers (with reduced linearity) and beta fibers improves the formability of the aluminum or aluminum alloy and reduces distortion of the aluminum through the manufacturing process. The disclosed microstructures may improve efficiency, speed of manufacture, and reduce the spoilage rate for aluminum products that undergo various shaping and forming processes.

The high amount of beta fibers and alpha fibers, with reduced linearity, in the aluminum alloy microstructure promotes increased formability. The proper combination of various texture components as described herein reduces the variation of the Lankford parameter, or r-value, from 00 to 900 with respect to the rolling direction of the metal sheet, plate, or shate. In particular, the proper combination of various texture components gives better consistency of production and a lower spoilage rate of highly-shaped aluminum products during shaping. Thus, by controlling the volume fraction of different texture components, the anisotropic forming behavior of the metal may be reduced for particular processing methods or product shapes.

The disclosed microstructures and their relative texture components allow the aluminum alloys to deform more favorably in specific directions under complex strain paths. The microstructure and/or grains of the metal can, in turn, react differently to stresses which are applied from different directions and/or orientations. For example, elongations may not be the same when the aluminum alloy grains are deformed in the rolling direction (00) compared to the transverse direction (90°). This difference in behavior is due to the difference in crystallographic orientation of the grains (i.e., the microstructure). Because the grains are oriented differently throughout the microstructure, different crystallographic slip systems, which may consist of various combinations of slip planes and/or directions, will influence the overall deformation. In order for the grains to accommodate the strain and/or deformation collectively without a loss in continuity, new dislocations may be generated. These dislocations may only move through the crystal on specific slip planes and in specific directions. When a lower number of slip planes are available, the material's ability to strain will be reduced. Conversely, when a greater number of slip planes are activated, the material's ability to strain will be increased. Thus, by controlling the volume fraction of different texture components, the anisotropic forming behavior of the metal may be reduced for particular processing methods or product shapes.

In some cases, the final gauge aluminum alloy products produced according to the methods described herein have a greater yield strength, ultimate tensile strength, uniform elongation, and total elongation than an aluminum alloy produced with high final cold reduction and/or a method without an inter-annealing step. The aluminum alloy products described herein can exhibit the yield strengths and ultimate tensile strengths as described herein when measured in a longitudinal (L) direction, a transverse (T) direction, and/or in a diagonal (D) direction, each respective to the rolling direction. In some embodiments, the final gauge aluminum alloy product produced according to the methods described herein has a yield strength at least about 6% greater than a yield strength of an aluminum alloy prepared by a method including a final cold rolling step that results in a greater than 70% reduction in thickness from the intermediate gauge aluminum alloy to the final gauge aluminum alloy (e.g., yield strengths at least 7% greater, at least 8% greater, at least 9% greater, at least 10% greater, at least 11% greater, at least 12% greater, at least 13% greater, at least 14% greater, at least 15% greater, at least 16% greater, at least 17% greater, at least 18% greater, or at least 19% greater). In some cases, the final gauge aluminum alloy product has an ultimate tensile strength of at least about 3% greater than an ultimate tensile strength of an aluminum alloy prepared by a method including a final cold rolling step that results in a greater than 70% reduction in thickness from the intermediate gauge aluminum alloy to the final gauge aluminum alloy (e.g., ultimate tensile strengths at least 4% greater, at least 5% greater, at least 6% greater, at least 7% greater, at least 8% greater, at least 9% greater, at least 10% greater, at least 11% greater, at least 12% greater, at least 13% greater, at least 14% greater, or at least 15% greater).

The aluminum alloy products described herein can exhibit the uniform elongations and total elongations as described herein when measured in a longitudinal (L) direction, a transverse (T) direction, and/or in a diagonal (D) direction, each respective to the rolling direction. In some cases, the final gauge aluminum alloy product has a total elongation of at least about 5% greater than a total elongation of an aluminum alloy prepared by a method including a final cold rolling step that results in a greater than 70% reduction in thickness from the intermediate gauge aluminum alloy to the final gauge aluminum alloy (e.g., at least 6% greater, at least 7% greater, at least 8% greater, at least 9% greater, at least 10% greater, at least 11% greater, at least 12% greater, at least 13% greater, at least 14% greater, at least 15% greater, at least 16% greater, at least 17% greater, at least 18% greater, or at least 19% greater). In some cases, the final gauge aluminum alloy product has a uniform elongation of at least about 3% greater than a uniform elongation of an aluminum alloy prepared by a method including a final cold rolling step that results in a greater than 70% reduction in thickness from the intermediate gauge aluminum alloy to the final gauge aluminum alloy (e.g., at least 4% greater, at least 5% greater, at least 6% greater, at least 7% greater, at least 8% greater, at least 9% greater, at least 10% greater, at least 11% greater, at least 12% greater, at least 13% greater, at least 14% greater, at least 15% greater, at least 16% greater, or at least 17% greater).

Alloy Compositions

Aluminum alloy properties are partially determined by the composition of the aluminum alloys. In certain aspects, the alloy composition may influence or even determine whether the alloy will have properties adequate for a desired application, e.g., formability and deep drawability. Among other properties, the aluminum alloys described herein display excellent elongation and forming properties.

In some cases, an aluminum alloy as described herein can have the following elemental composition as provided in Table 1.

TABLE 1

| Element | Weight Percentage (wt. %) |
| --- | --- |
| Si | 0.5-2.0 |
| Fe | 0.1-0.4 |
| Cu | 0.0-0.4 |
| Mg | 0.0-0.5 |
| Mn | 0.02-0.1 |
| Ti | 0.0-0.15 |
| Cr | 0.0-0.20 |
| Zn | 0.0-0.1 |
| Others | 0-0.05 (each) |
|  | 0-0.15 (total) |
| Al | Up to 99 |

In some examples, the aluminum alloy as described herein can have the following elemental composition as provided in Table 2.

TABLE 2

| Element | Weight Percentage (wt. %) |
| --- | --- |
| Si | 0.7-1.4 |
| Fe | 0.1-0.3 |
| Cu | 0.0-0.2 |
| Mg | 0.0-0.4 |
| Mn | 0.02-0.08 |
| Ti | 0.0-0.05 |
| Cr | 0.0-0.015 |
| Zn | 0.0-0.1 |
| Others | 0-0.05 (each) |
|  | 0-0.15 (total) |
| Al | Up to 99 |

In some examples, the aluminum alloy as described herein can have the following elemental composition as provided in Table 3.

TABLE 3

| Element | Weight Percentage (wt. %) |
| --- | --- |
| Si | 1.0-1.4 |
| Fe | 0.12-0.20 |
| Cu | 0.0-0.15 |
| Mg | 0.0-0.35 |
| Mn | 0.04-0.08 |
| Ti | 0.0-0.02 |
| Cr | 0.0-0.02 |

TABLE 3-continued

| Element | Weight Percentage (wt. %) |
| --- | --- |
| Zn | 0.0-0.04 |
| Others | 0-0.05 (each) |
|  | 0-0.15 (total) |
| Al | Up to 98.8 |

In some examples, the aluminum alloy described herein includes silicon (Si) in an amount of from about 0.5% to about 2.0% (e.g., from about 0.7 to about 1.5% or from about 1.0 to about 1.4%) based on the total weight of the alloy. For example, the alloy can include 0.5%, 0.51%, 0.52%, 0.53%, 0.54%, 0.55%, 0.56%, 0.57%, 0.58%, 0.59%, 0.6%, 0.61%, 0.62%, 0.63%, 0.64%, 0.65%, 0.66%, 0.67%, 0.68%, 0.69%, 0.7%, 0.71%, 0.72%, 0.73%, 0.74%, 0.75%, 0.76%, 0.77%, 0.78%, 0.79%, 0.8%, 0.81%, 0.82%, 0.83%, 0.84%, 0.85%, 0.86%, 0.87%, 0.88%, 0.89%, 0.9%, 0.91%, 0.92%, 0.93%, 0.94%, 0.95%, 0.96%, 0.97%, 0.98%, 0.99%, 1.0%, 1.01%, 1.02%, 1.03%, 1.04%, 1.05%, 1.06%, 1.07%, 1.08%, 1.09%, 1.1%, 1.11%, 1.12%, 1.13%, 1.14%, 1.15%, 1.16%, 1.17%, 1.18%, 1.19%, 1.2%, 1.21%, 1.22%, 1.23%, 1.24%, 1.25%, 1.26%, 1.27%, 1.28%, 1.29%, 1.3%, 1.31%, 1.32%, 1.33%, 1.34%, 1.35%, 1.36%, 1.37%, 1.38%, 1.39%, 1.4%, 1.41%, 1.42%, 1.43%, 1.44%, 1.45%, 1.46%, 1.47%, 1.48%, 1.49%, 1.5%, 1.51%, 1.52%, 1.53%, 1.54%, 1.55%, 1.56%, 1.57%, 1.58%, 1.59%, 1.6%, 1.61%, 1.62%, 1.63%, 1.64%, 1.65%, 1.66%, 1.67%, 1.68%, 1.69%, 1.7%, 1.71%, 1.72%, 1.73%, 1.74%, 1.75%, 1.76%, 1.77%, 1.78%, 1.79%, 1.8%, 1.81%, 1.82%, 1.83%, 1.84%, 1.85%, 1.86%, 1.87%, 1.88%, 1.89%, 1.9%, 1.91%, 1.92%, 1.93%, 1.94%, 1.95%, 1.96%, 1.97%, 1.98%, 1.99%, or 2.0% Si. All expressed in wt. %.

In some examples, the aluminum alloy described herein includes iron (Fe) in an amount of from about 0.05% to about 0.40% (e.g., from about 0.05% to about 0.25%, from about 0.05% to about 0.20%, from about 0.08% to about 0.30%, from about 0.08% to about 0.25%, from about 0.08% to about 0.20%, from about 0.1% to about 0.30%, from about 0.1% to about 0.25%, or from about 0.1% to about 0.20%) based on the total weight of the alloy. For example, the alloy can include 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, or 0.40% Fe. All expressed in wt. %.

In some examples, the aluminum alloy described herein includes copper (Cu) in an amount of up to about 0.4% (e.g., from 0.0% to about 0.4%, from 0.0% to about 0.35%, from about 0.02% to about 0.30%, from about 0.05% to about 0.28%, from about 0.06% to about 0.25%, from about 0.8% to about 0.22%, from about 0.1% to about 0.20%, from about 0.1% to about 0.18%, from about 0.1% to about 0.16%, or from about 0.1% to about 0.15%) based on the total weight of the alloy. For example, the alloy can include 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, or 0.4% Cu. In some cases, Cu is not present in the alloy (i.e., 0%). All expressed in wt. %.

In some examples, the aluminum alloy described herein includes magnesium (Mg) in an amount of up to about 0.5% (e.g., from 0.0% to about 0.5%, from about 0.01% to about 0.48%, from about 0.02% to about 0.46%, from about 0.05% to about 0.45%, from about 0.08% to about 0.42%, from about 0.1% to about 0.40%, from about 0.15% to about 0.38%, from about 0.18% to about 0.36%, from about 0.2% to about 0.35%, or from about 0.25% to about 0.35%) based on the total weight of the alloy. For example, the alloy can include 0.10%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.41%, 0.42%, 0.43%, 0.44%, 0.45%, 0.46%, 0.47%, 0.48%, 0.49%, or 0.5% Mg. In some cases, Mg is not present in the alloy (i.e., 0%). All expressed in wt. %.

In some examples, the aluminum alloy described herein includes manganese (Mn) in an amount of from about 0.02% to about 0.1% (e.g., from about 0.02% to about 0.09%, from about 0.02% to about 0.08%, from about 0.03% to about 0.7%, from about 0.04% to about 0.06%, from about 0.05% to about 0.06%, from about 0.05% to about 0.08%, or from about 0.06% to about 0.09%) based on the total weight of the alloy. For example, the alloy can include 0.02%, 0.03%, 0.04%, 0.05%, 0.06%, 0.07%, 0.08%, 0.09%, or 0.1% Mn. All expressed in wt. %.

In some examples, the aluminum alloy described herein includes chromium (Cr) in an amount of up to about 0.25% (e.g., from about 0.01% to about 0.25%, from about 0.01% to about 0.20%, from about 0.01% to about 0.15%, from about 0.02% to about 0.25%, from about 0.02% to about 0.20%, from about 0.02% to about 0.15%, from about 0.03% to about 0.25%, from about 0.03% to about 0.20%, or from about 0.03% to about 0.15%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, or 0.25% Cr. In some cases, Cr is not present in the alloy (i.e., 0%). All expressed in wt. %.

In some examples, the aluminum alloy described herein can include one or both of titanium (Ti) and zinc (Zn). In some examples, the aluminum alloy described herein includes Ti in an amount up to about 0.1% (e.g., from about 0.001% to about 0.08%, from about 0.002% to about 0.005%, from about 0.005% to about 0.06%, from about 0.008% to about 0.06%, from about 0.01% to about 0.05%, or from about 0.02% to about 0.05%) based on the total weight of the alloy. For example, the alloy can include 0.001%, 0.002%, 0.003%, 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, or 0.1% Ti. In some cases, Ti is not present in the alloy (i.e., 0%). In some examples, the aluminum alloy described herein includes Zn in an amount up to about 0.1% (e.g., from about 0.001% to about 0.08% or from about 0.005% to about 0.06%) based on the total weight of the alloy. For example, the alloy can include 0.001%, 0.002%, 0.003%, 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, or 0.1% Zn. In some cases, Zn is not present in the alloy (i.e., 0%). In some cases, Ti and Zn are not present in the alloy (i.e., 0%). All expressed in wt. %.

Optionally, the aluminum alloys described herein can further include other minor elements, sometimes referred to as impurities, in amounts of 0.05% or below, 0.04% or below, 0.03% or below, 0.02% or below, or 0.01% or below. These impurities may include, but are not limited to V, Ni, Sc, Hf, Zr, Sn, Ga, Ca, Bi, Na, Pb, or combinations thereof. Accordingly, V, Ni, Sc, Hf, Zr, Sn, Ga, Ca, Bi, Na, or Pb may be present in alloys in amounts of 0.05% or below, 0.04% or below, 0.03% or below, 0.02% or below, or 0.01% or below. The sum of all impurities does not exceed 0.15% (e.g., 0.1%). All expressed in wt. %. The remaining percentage of each alloy can be aluminum.

The aluminum alloys described herein can contain at least about 40 wt. % recycled content. For example, the aluminum alloys can contain at least about 45 wt. %, at least about 50 wt. %, at least about 60 wt. %, at least about 70 wt. %, at least about 80 wt. %, at least about 90 wt. %, or at least about 95 wt. % recycled content.

In some examples, the aluminum alloy products have a yield strength of about 100 MPa or greater when in, for example, a T4 temper. For example, the aluminum alloy products can have a yield strength of 100 MPa or greater, 105 MPa or greater, 110 MPa or greater, 115 MPa or greater, 120 MPa or greater, 125 MPa or greater, 130 MPa or greater, 135 MPa or greater, or 140 MPa or greater. In some cases, the yield strength is from about 100 MPa to about 140 MPa (e.g., from about 105 MPa to about 135 MPa, from about 110 MPa to about 130 MPa, or from about 115 MPa to about 125 MPa). The aluminum alloy products described herein can exhibit the yield strengths as described herein when measured in a longitudinal (L) direction, a transverse (T) direction, and/or in a diagonal (D) direction, each respective to the rolling direction.

In some examples, the aluminum alloy products have an ultimate tensile strength of about 200 MPa or greater when in, for example, a T4 temper. For example, the aluminum alloy products can have an ultimate tensile strength of 205 MPa or greater, 210 MPa or greater, 215 MPa or greater, 220 MPa or greater, 225 MPa or greater, 230 MPa or greater, 235 MPa or greater, 240 MPa or greater, 245 MPa or greater, or 250 MPa or greater. In some cases, the ultimate tensile strength is from about 200 MPa to about 250 MPa (e.g., from about 205 MPa to about 245 MPa, from about 210 MPa to about 240 MPa, or from about 215 MPa to about 235 MPa). The aluminum alloy products described herein can exhibit the ultimate tensile strengths as described herein when measured in a longitudinal (L) direction, a transverse (T) direction, and/or in a diagonal (D) direction, each respective to the rolling direction.

In some cases, the aluminum alloy products can have a uniform elongation of at least about 20% and up to about 30% when in, for example, a T4 temper. For example, the aluminum alloy products can have a uniform elongation of about 20%, 21%, 22%, 23%, 24%, 25%, 26%, 27%, 28%, 29%, or 30%, or anywhere in between. The aluminum alloy products described herein can exhibit the uniform elongations as described herein when measured in a longitudinal (L) direction, a transverse (T) direction, and/or in a diagonal (D) direction, each respective to the rolling direction.

In some cases, the aluminum alloy products can have a total elongation of at least about 27% and up to about 35% when in, for example, a T4 temper. For example, the aluminum alloy products can have a total elongation of about 27%, 28%, 29%, 30%, 31%, 32%, 33%, 34%, or 35%, or anywhere in between. The aluminum alloy products described herein can exhibit the total elongations as described herein when measured in a longitudinal (L) direction, a transverse (T) direction, and/or in a diagonal (D) direction, each respective to the rolling direction.

Methods of Using

The alloys and methods described herein can be used in automotive and/or transportation applications, including motor vehicle, aircraft, and railway applications, or any other desired application. In some examples, the alloys and methods can be used to prepare motor vehicle body part products, such as safety cages, bodies-in-white, crash rails, bumpers, side beams, roof beams, cross beams, pillar reinforcements (e.g., A-pillars, B-pillars, and C-pillars), inner panels, outer panels, side panels, inner hoods, outer hoods, or trunk lid panels. The aluminum alloys and methods described herein can also be used in aircraft or railway vehicle applications, to prepare, for example, external and internal panels.

The alloys and methods described herein can also be used in electronics applications, to prepare, for example, external and internal encasements. For example, the alloys and methods described herein can also be used to prepare housings for electronic devices, including mobile phones and tablet computers. In some examples, the alloys can be used to prepare housings for the outer casing of mobile phones (e.g., smart phones) and tablet bottom chassis. The products and methods can be used in any other desired application, e.g., bottles, food containers, etc.

Illustrations of Suitable Methods and Alloy Products

Illustration 1 is a method of producing an aluminum alloy product, comprising: casting an aluminum alloy to produce a cast aluminum alloy article; homogenizing the cast aluminum alloy article to produce a homogenized cast aluminum alloy article; hot rolling the homogenized cast aluminum article to produce a hot rolled product; cold rolling the hot rolled product in a first cold rolling step to produce a first cold rolled product having an intermediate gauge, wherein the first cold rolling step results in an about 25% to 70% reduction in thickness; cold rolling the first cold rolled product in a second cold rolling step to produce a final gauge aluminum alloy product, wherein the second cold rolling step results in an about 40% to about 70% reduction in thickness from the intermediate gauge.

Illustration 2 is the method of any preceding or subsequent illustration, further comprising inter-annealing the first cold rolled product.

Illustration 3 is the method of any preceding or subsequent illustration, wherein the inter-annealing step is performed at an inter-annealing temperature of from about 300° C. to about 450° C.

Illustration 4 is the method of any preceding or subsequent illustration, wherein the intermediate gauge comprises a thickness ranging from about 2 mm to about 6 mm.

Illustration 5 is the method of any preceding or subsequent illustration, further comprising solution heat treating the final gauge aluminum alloy product to produce an aluminum alloy product.

Illustration 6 is the method of any preceding or subsequent illustration, wherein the final gauge comprises a thickness ranging from about 0.1 mm to about 3 mm.

Illustration 7 is the method of any preceding or subsequent illustration, wherein the second cold rolling step results in an about 40% to less than about 70% reduction in thickness from the intermediate gauge.

Illustration 8 is the method of any preceding or subsequent illustration, wherein the casting step comprises direct chill casting or continuous casting.

Illustration 9 is the method of any preceding or subsequent illustration, wherein the homogenizing step is performed at a homogenization temperature of from about 450° C. to about 600° C.

Illustration 10 is the method of any preceding or subsequent illustration, wherein the hot rolling step is performed at a hot rolling temperature of from about 500° C. to about 560° C.

Illustration 11 is the method of any preceding or subsequent illustration, wherein a volume fraction of alpha fibers in the aluminum alloy product comprises at least about 8%.

Illustration 12 is the method of any preceding or subsequent illustration, wherein a volume fraction of beta fibers in the aluminum alloy product comprises at least about 6%.

Illustration 13 is the method of any preceding or subsequent illustration, wherein a ratio of the volume fraction of alpha fibers to the volume fraction of beta fibers in the aluminum alloy product ranges from about 0.5:1 to 2:1.

Illustration 14 is the method of any preceding or subsequent illustration, wherein the final gauge aluminum alloy product is isotropic.

Illustration 15 is the method of any preceding or subsequent illustration, wherein the final gauge aluminum alloy product comprises a yield strength of at least about 5% greater than a yield strength of an aluminum alloy prepared by a method including a final cold rolling step that results in a greater than 70% reduction in thickness from the intermediate gauge aluminum alloy to the final gauge aluminum alloy.

Illustration 16 is the method of any preceding or subsequent illustration, wherein the final gauge aluminum alloy product comprises an ultimate tensile strength of at least about 3% greater than an ultimate tensile strength of an aluminum alloy prepared by a method including a final cold rolling step that results in a greater than 70% reduction in thickness from the intermediate gauge aluminum alloy to the final gauge aluminum alloy.

Illustration 17 is the method of any preceding or subsequent illustration, wherein the final gauge aluminum alloy product has a total elongation of at least about 5% greater than a total elongation of an aluminum alloy prepared by a method including a final cold rolling step that results in a greater than 70% reduction in thickness from the intermediate gauge aluminum alloy to the final gauge aluminum alloy.

Illustration 18 is the method of any preceding or subsequent illustration, wherein the aluminum alloy comprises about 0.5 to 2.0 wt. % Si, 0.1 to 0.4 wt. % Fe, up to 0.4 wt. % Cu, up to 0.5 wt. % Mg, 0.02 to 0.1 wt. % Mn, up to 0.02 wt. % Cr, up to 0.15 wt. % Ti, up to 0.1 wt. % Zn, up to 0.15 wt. % impurities, and Al.

Illustration 19 is the method of any preceding or subsequent illustration, wherein the aluminum alloy comprises about 0.7 to 1.4 wt. % Si, 0.1 to 0.3 wt. % Fe, up to 0.2 wt. % Cu, up to 0.4 wt. % Mg, 0.02 to 0.08 wt. % Mn, up to 0.015 wt. % Cr, up to 0.05 wt. % Ti, up to 0.1 wt. % Zn, up to 0.15 wt. % impurities, and Al.

Illustration 20 is the method of any preceding or subsequent illustration, wherein the aluminum alloy comprises about 1.0 to 1.4 wt. % Si, 0.12 to 0.20 wt. % Fe, up to 0.15 wt. % Cu, up to 0.35 wt. % Mg, 0.04 to 0.08 wt. % Mn, 0.01 to 0.02 wt. % Cr, up to 0.02 wt. % Ti, up to 0.04 wt. % Zn, up to 0.15 wt. % impurities, and Al.

Illustration 21 is the method of any preceding or subsequent illustration, wherein the final gauge aluminum alloy product comprises an automobile body part.

Illustration 22 is an aluminum alloy comprising: about 0.5 to 2.0 wt. % Si, 0.1 to 0.4 wt. % Fe, up to 0.4 wt. % Cu, up to 0.5 wt. % Mg, 0.02 to 0.1 wt. % Mn, up to 0.02 wt. % Cr, up to 0.15 wt. % Ti, up to 0.1 wt. % Zn, up to 0.15 wt. % impurities, and Al, wherein the aluminum alloy microstructure comprises a volume fraction of beta fibers of at least about 6%.

Illustration 23 is the aluminum alloy of any preceding or subsequent illustration, wherein a volume fraction of alpha fibers in the aluminum alloy microstructure comprises at least about 8%.

Illustration 24 is the aluminum alloy of any preceding or subsequent illustration, wherein a ratio of the volume fraction of the alpha fibers to the volume fraction of the beta fibers in the aluminum alloy ranges from about 0.5:1 to 2:1.

Illustration 25 is the aluminum alloy of any preceding or subsequent illustration, wherein the aluminum alloy is isotropic.

Illustration 26 is the aluminum alloy of any preceding or subsequent illustration, wherein the aluminum alloy comprises a final gauge thickness ranging from about 0.1 mm to about 3 mm.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

EXAMPLES

Example 1: Properties of the Aluminum Alloy Product

Three aluminum alloy product samples (Alloys 1-3) were each prepared having the composition as shown in Table 4.

TABLE 4

| | Si | Fe | Cu | Mn | Mg | Ti | Zn | Cr |
|---|---|---|---|---|---|---|---|---|
| Alloy | 1.33 | 0.16 | 0.12 | 0.073 | 0.30 | 0.018 | 0.034 | 0.010 |

In Table 4, all values are weight percent (wt. %) based on the total weight of the aluminum alloy composition. The alloys can contain aluminum and up to 0.15 wt. % total impurities.

Alloys 1-3 were each processed through three various routes where the final downstream processing step was modified to get various final cold reductions. Alloys 1 and 2 were processed with a high final cold reduction and Alloy 3 was processed with a low final cold reduction, as further detailed below. In addition, Alloys 1 and 2 were each processed by a method without a batch inter-annealing step.

FIG. 1A is a schematic depicting a processing method 100 for Alloy 1. Alloy 1 was direct chill cast to provide an ingot 110. The ingot 110 was subjected to a homogenization step as described above. The ingot 110 was then subjected to hot rolling in a reversing mill to break down the ingot 110 resulting in a reduction in thickness of 94% from a thickness of 670 mm to 40 mm. After break down, the ingot 110 was further subjected to hot rolling in a tandem mill to provide a hot rolled product. In the hot rolling step in the tandem mill, the thickness of the ingot was reduced by 85% from a thickness of 40 mm to 6 mm. The hot rolled product was further subjected to cold rolling in a cold mill to provide a final gauge aluminum alloy product. In the cold rolling step, the thickness of the hot rolled product was reduced by 85% from a thickness of 6 mm to 0.9 mm. In the process for producing Alloy 1, the aluminum alloy product was subjected to high final cold reduction and was processed without intermediate batch annealing.

Figure 1B:
FIG. 1B is a schematic depicting a processing method including coil cooling and having high final cold reduction.

FIG. 1B is a schematic depicting a second processing method 150 for Alloy 2. Alloy 2 was direct chill cast to provide an ingot 110. The ingot 110 was subjected to a homogenization step as described above. The ingot 110 was then subjected to hot rolling in a reversing mill to break down the ingot 110 resulting in a reduction in thickness of 94% from a thickness of 670 mm to 40 mm. After break down, the ingot 110 was further subjected to hot rolling in a tandem mill to provide a hot rolled product. In the hot rolling step in the tandem mill, the thickness of the ingot was reduced by 85% from a thickness of 40 mm to 6 mm. After hot rolling, the hot rolled product was coiled and allowed to cool to room temperature. The cooled hot rolled product was further subjected to cold rolling in a cold mill to provide a final gauge aluminum alloy product. In the cold rolling step, the thickness of the hot rolled product was reduced by 85% from a thickness of 6 mm to 0.9 mm. In the process for producing Alloy 2, the aluminum alloy product was subjected to high final cold reduction and was processed without intermediate batch annealing.

Figure 2:
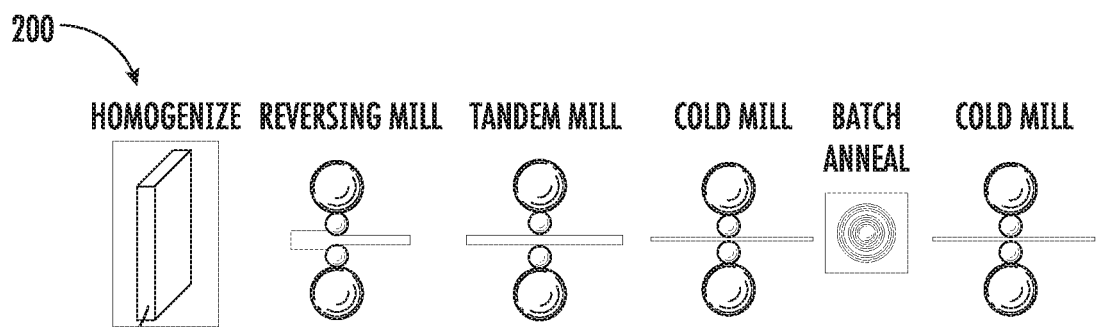
FIG. 2 is a schematic depicting a processing method as described herein having low final cold reduction.

FIG. 2 is a schematic depicting a second processing method 200 according to the methods described herein. Alloy 3 was direct chill cast to provide an ingot 210. The ingot 210 was subjected to a homogenization step as described above. The ingot 210 was then subjected to hot rolling in a reversing mill to break down the ingot 210 resulting in a reduction in thickness of 94% from a thickness of 670 mm to 40 mm. After break down, the ingot 210 was further subjected to hot rolling in a tandem mill to provide a hot rolled product. In the hot rolling step in the tandem mill, the thickness of the ingot was reduced by 85% from a thickness of 40 mm to 6 mm. The hot rolled product was further subjected to cold rolling (i.e., a first cold rolling step) to produce a first cold rolled product.

In the first cold rolling step, the thickness of the hot rolled product was reduced by 50% from a thickness of 6 mm to 3 mm. The first cold rolled product was coiled and annealed in a furnace in a batch inter-annealing step. In the batch inter-annealing step, the first cold rolled product was heated to a temperature of about 410° C. at a heating rate of about 50° C./h and soaked for about 2 hours followed by coil cooling to room temperature at a cooling rate of about 12° C./h. After batch inter-annealing, the first cold rolled product was further subjected to a second cold rolling step in a cold mill to produce a final gauge aluminum alloy product. In the second cold rolling step, the thickness of the first cold product was reduced by 70% from a thickness of 3 mm to 0.9 mm. The second cold rolling step resulted in a low final cold reduction, e.g., a 70% or less reduction in gauge thickness. In the process for producing Alloy 3, the aluminum alloy product was subjected to a two-stage cold reduction process with an inter-annealing step between the first and second cold rolling steps.

Figure 3:
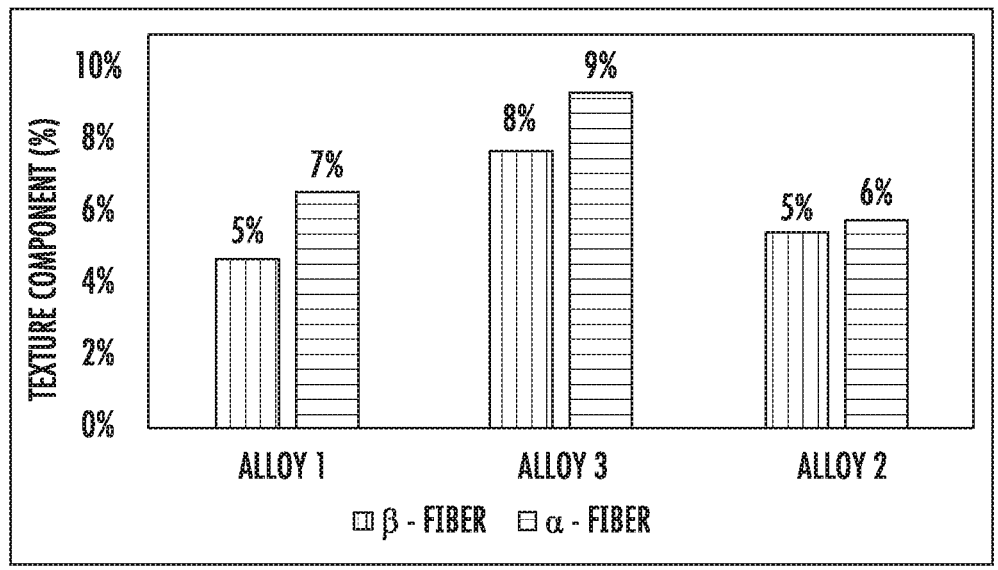
FIG. 3 is a graph showing the texture content of aluminum alloys as described herein.

FIG. 3 is a graph showing the distribution of texture components in the microstructure of Alloys 1-3. The texture components include alpha fibers, e.g., Cube, Goss, and Rotated Goss, and beta fibers, e.g., Brass, S, and Copper. In FIG. 3, the first histogram bar for each set represents Alloy 1 processed without batch annealing and with a high (e.g., greater than 70%) final cold reduction, the second histogram bar for each set represents Alloy 2 processed without batch annealing and with a high (e.g., greater than 70%) final cold reduction, and the third histogram bar for each set represents Alloy 3 processed with batch annealing and with a low (e.g., 70% or less) final cold reduction. Alloy 3 exhibited a greater amount of the alpha fibers (e.g., 9%) as compared to Alloy 1 (e.g., 7%) and Alloy 2 (e.g., 6%). Alloy 3 also exhibited a greater amount of the beta fibers (e.g., 8%) as compared to Alloy 1 (e.g., 5%) and Alloy 2 (e.g., 5%). Alloy 3, processed with batch annealing and a low final cold reduction, exhibited a greater amount of the textural component as compared to samples processed with high final cold work reduction and without batch annealing. In particular, Alloy 3 had a higher proportion of alpha fibers and beta fibers as well as a balanced distribution of texture components that were not linear, which favors uniform stretching. Additionally, Alloy 3 exhibited isotropic properties, having a similar content of alpha fibers and beta fibers.

Figure 4:
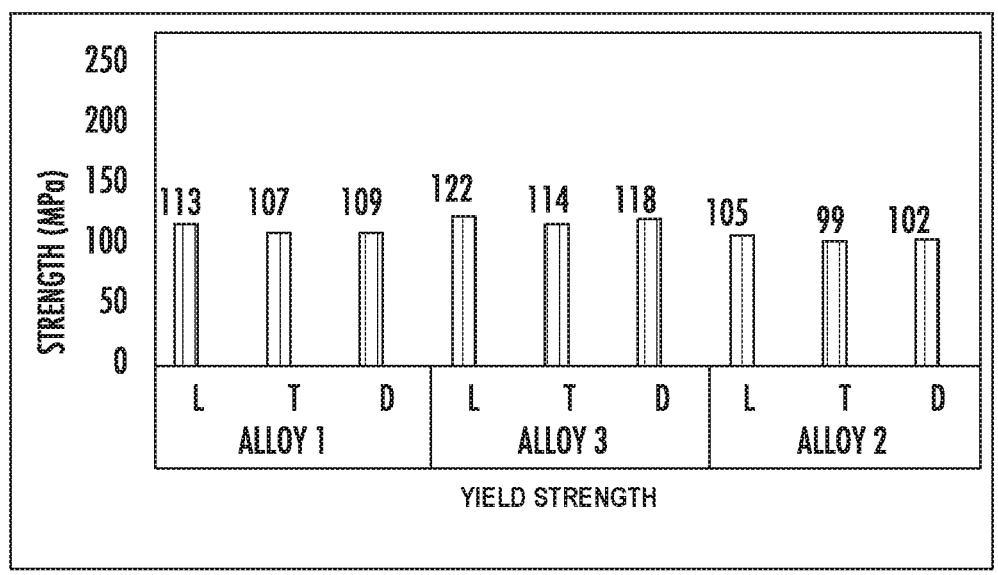
FIG. 4 is a graph showing the yield strength of aluminum alloys as described herein.

FIG. 4 is a graph showing the yield strengths of test samples taken from Alloy 1, Alloy 2, and Alloy 3. Tensile properties were evaluated in three directions including longitudinal (referred to as "L"), transverse (referred to as "T"), and diagonal (referred to as "D"), all with respect to the rolling direction during processing. Alloy 1 and Alloy 2 were processed according to the processing method of FIGS. 1A and 1B, respectively, without a batch inter-annealing step during cold rolling, and with a high (e.g., greater than 70%) final cold reduction. Alloy 3 was processed according to the method of FIG. 2 including the batch inter-annealing step during cold rolling and low (e.g., 70% or less) final cold reduction. The first histogram bar for each set represents Alloy 1, the second histogram bar for each set represents Alloy 2, and the third histogram bar for each set represents Alloy 3. As shown in FIG. 4, the yield strengths of both Alloy 1 and Alloy 2 in T4 temper were less than the yield strength of Alloy 3, irrespective of the tensile test direction. For example, the yield strengths of both Alloy 1 and Alloy 2 ranged from 99 MPa to 113 MPa, and the yield strength of Alloy 3 ranged from 114 MPa to 122 MPa in all test directions, demonstrating isotropic tensile properties. Additionally, Alloy 3 exhibited excellent yield strength, thus demonstrating a highly-formable aluminum alloy having ample strength for various automotive applications (e.g., structural parts, aesthetic parts, and/or any combination thereof).

Figure 5:
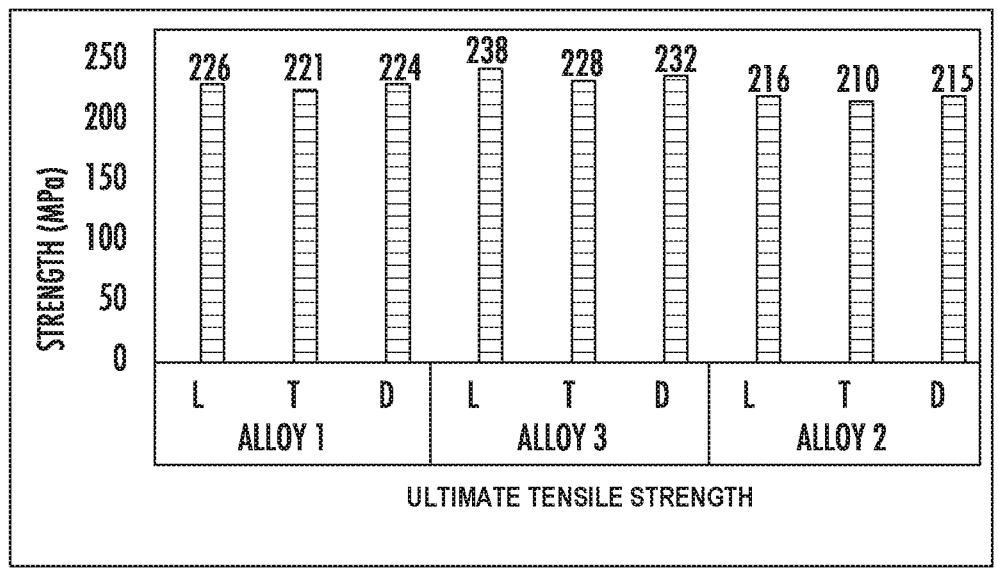
FIG. 5 is a graph showing the ultimate tensile strength of aluminum alloys as described herein.

FIG. 5 is a graph showing the ultimate tensile strength of test samples taken from Alloy 1, Alloy 2, and Alloy 3. Preparation, processing, and testing were performed as in the example of FIG. 4. In FIG. 5, the tensile properties are shown in sets based on the test direction as described above (i.e., L, T, or D). The first histogram bar for each set represents Alloy 1, the second histogram bar for each set represents Alloy 2, and the third histogram bar for each set represents Alloy 3. As shown in FIG. 5, Alloy 3 exhibited excellent ultimate tensile strength, thus demonstrating a highly-formable aluminum alloy having ample strength for various automotive applications. In fact, Alloy 3, which was processed with batch annealing and a low final cold reduction, had a greater ultimate tensile strength than Alloy 1 and Alloy 2, which were processed without batch annealing and with a high final cold reduction.

Figure 6:
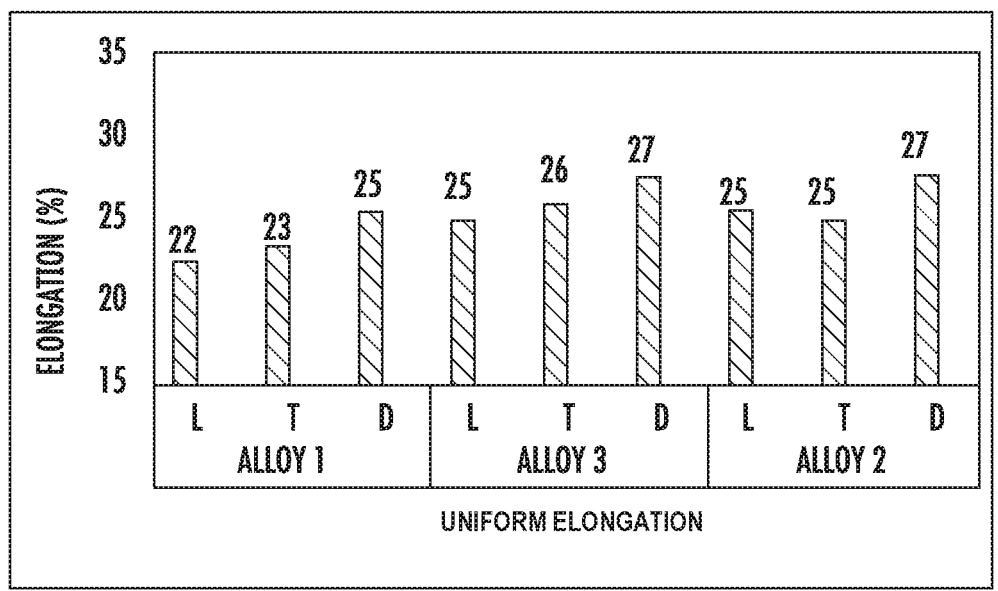
FIG. 6 is a graph showing the uniform elongation of aluminum alloys as described herein.

FIG. 6 is a graph showing the uniform elongation of test samples taken from Alloy 1, Alloy 2, and Alloy 3. Formability properties were evaluated in three directions including longitudinal (referred to as "L"), transverse (referred to as "T"), and diagonal (referred to as "D"), all with respect to the rolling direction during processing. Alloy 1 and Alloy 2 were processed according to the methods depicted in FIGS. 1A and 1B, respectively, as described above, and Alloy 3 was processed according to the method depicted in FIG. 2, as described above with batch annealing and low final cold reduction. In FIG. 6, the uniform elongation properties are shown in sets based on the direction as described above (i.e., L, T, or D). The first histogram bar for each set represents Alloy 1, the second histogram bar for each set represents Alloy 2, and the third histogram bar for each set represents Alloy 3. As shown in FIG. 6, Alloy 3 exhibited an equal or greater uniform elongation in each direction (L, T, and D) than Alloy 1 and Alloy 2.

Figure 7:
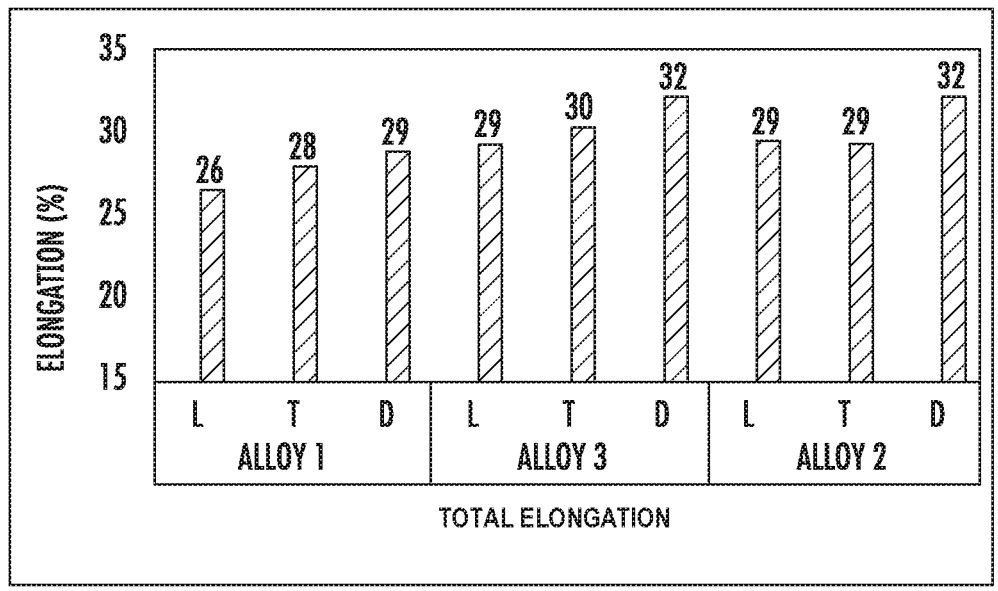
FIG. 7 is a graph showing the total elongation of aluminum alloys as described herein.

FIG. 7 is a graph showing the total elongation of test samples taken from Alloy 1, Alloy 2, and Alloy 3. Alloy 1 and Alloy 2 were processed according to the methods described above and depicted in FIGS. 1A and 1B, respectively, and Alloy 3 was processed according to the method depicted in FIG. 2, as described above, with batch annealing and low final cold reduction. In FIG. 7, the elongation properties are shown in sets based on the direction, as described above (i.e., L, T, or D). The first histogram bar for each set represents Alloy 1, the second histogram bar for each set represents Alloy 2, and the third histogram bar for each set represents Alloy 3. As shown in FIG. 7, the total elongations of Alloy 3 in T4 temper were between 29-32% irrespective of the tensile test direction, showing the isotropic properties of Alloy 3. Although Alloy 2 has similar total elongations in the L and D directions, Alloy 3 achieved a better total elongation in the T direction. Additionally, Alloy 3 exhibited the same or better total elongation than Alloy 2 in each of the L, T, and D directions while requiring less cold work and using less energy in each cold work process step. Further, Alloy 3 exhibited more uniform stretching in each of the L, T, and D directions compared to Alloys 1 and 2.

Figure 8:
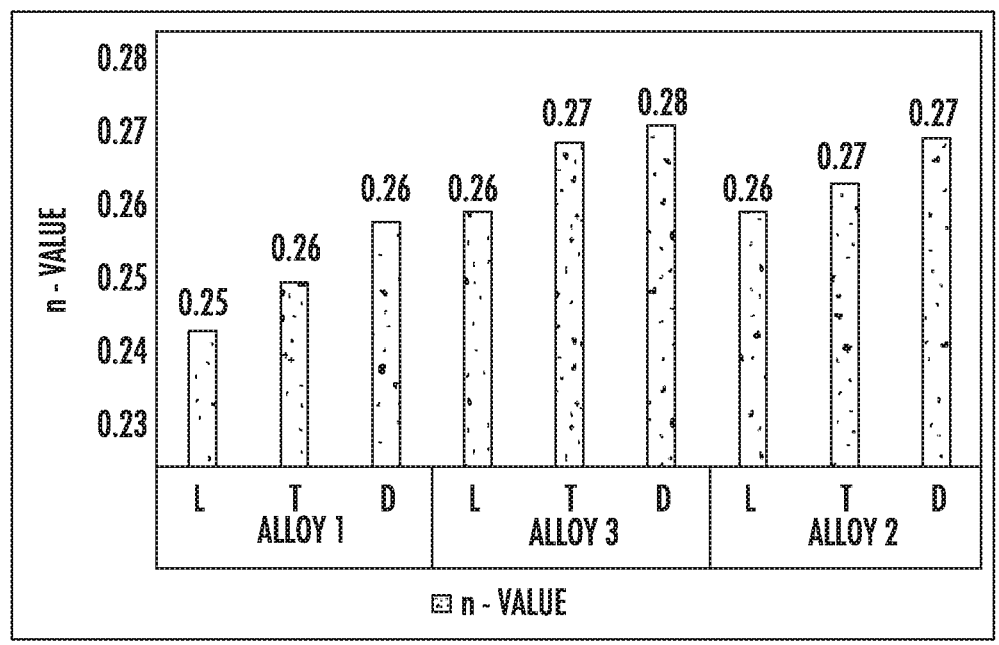
FIG. 8 is a graph showing the n-values (i.e., increase in strength after deformation) of aluminum alloys as described herein.

FIG. 8 is a graph showing n-values (i.e., increase in strength after deformation) for Alloy 1, Alloy 2, and Alloy 3, each prepared and processed as described above. In FIG. 8, the n-values are shown in sets based on the direction (i.e., L, T, or D). The first histogram bar for each set represents Alloy 1, the second histogram bar for each set represents Alloy 2, and the third histogram bar for each set represents Alloy 3. As shown in FIG. 8, Alloy 3 sample exhibited equal or higher n-values than Alloys 1 and 2, and thus had improved formability.

Figure 9:
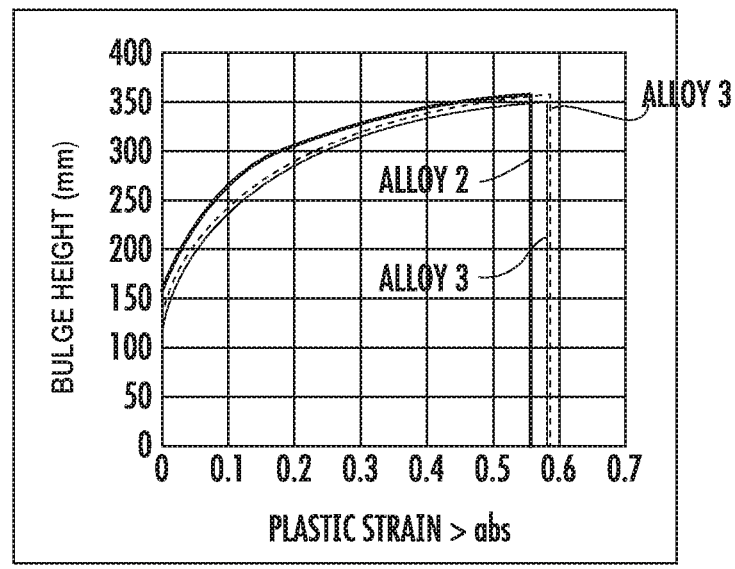
FIG. 9 is a graph showing the bulge-test deformation of aluminum alloys as described herein.

FIG. 9 is a graph showing bulge test values for Alloy 2 and Alloy 3, each prepared and processed as described above. The bulge test measures the alloy's ability to deform after large strains in bi-axial stress states. The test is conducted by deforming a rigidly clamped square blank with pressurized hydraulic fluid. The pressurized fluid generates a frictionless force which deforms the material. One parameter used to measure an alloy's performance during the bulge test is the maximum distance the material has deformed, e.g., bulge height, prior to failure. As shown in FIG. 9, Alloy 3 exhibited a greater bulge height than Alloy 2. For example, Alloy 3 exhibited a bulge height that was 6% greater than Alloy 2.

Figure 10:
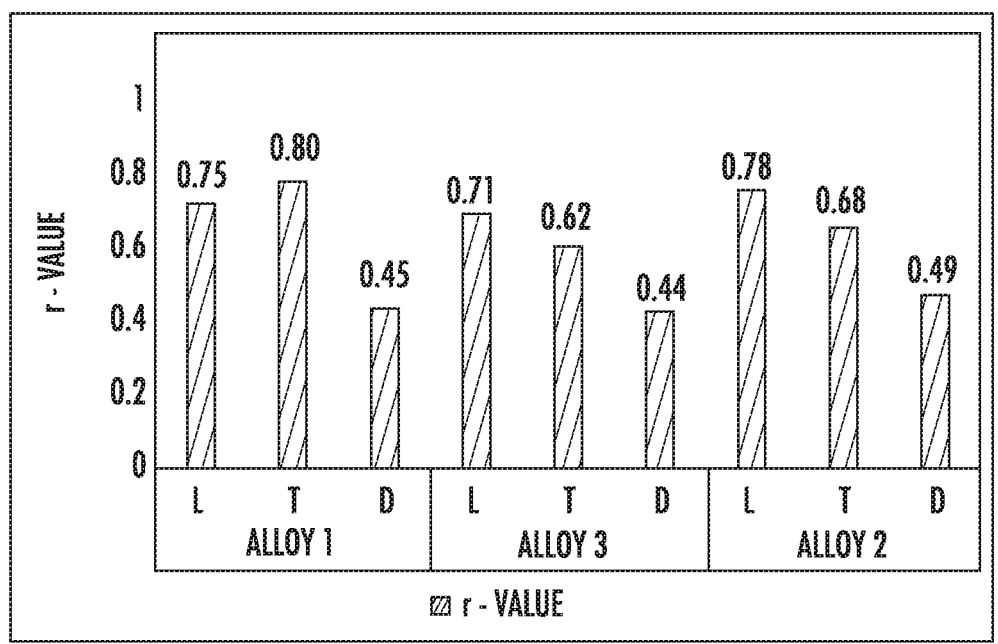
FIG. 10 is a graph showing the r-values of aluminum alloys as described herein.

FIG. 10 is a graph showing r-values for Alloy 1, Alloy 2, and Alloy 3, each prepared and processed as described above. Alloy 1 and Alloy 2 were processed according to the methods described above and depicted in FIGS. 1A and 1B, respectively, and Alloy 3 was processed according to the method depicted in FIG. 2, as described above, with batch annealing and low final cold reduction. In FIG. 10, the r-values are shown in sets based on the direction, as described above (i.e., L, T, or D). As described above, the r-value measures the ability to deform after large strains in bi-axial stress states. The test is conducted by deforming a rigidly clamped square blank with pressurized hydraulic fluid. The pressurized fluid generates a frictionless force which deforms the material. As shown in FIG. 10, Alloy 3 exhibited the least variation in r-value between each of the stress directions, demonstrating its isotropic properties. For example, Alloy 3 exhibited about a 38% deviation in r-value between the L and D directions, whereas Alloy 1 exhibited about a 40% deviation in r-value between the L and D directions. Alloy 3 exhibited about a 29% deviation in r-value between the T and D directions, whereas Alloy 1 exhibited about a 44% deviation in r-value between the T and D directions. Alloy 3 exhibited about a 12.7% deviation in r-value between the L and T directions, whereas Alloy 2 exhibited about a 12.8% deviation in r-value between the L and T directions.

Alloy 2 and Alloy 3 were each subjected to a cross-die test. The cross-die tests were performed with a standard cross-die tool at a clamping force of 15 kN, a stamping speed of 8 mm/s, and a stamping depth between 40-70 mm. The size of the starting blanks was 250 mm in width and 250 mm in length and the starting thickness was 0.9 mm. The samples were lubricated using an electrostatic spray bar with a hot melt at a coating weight of 0.5 g/m² to remove potential friction effects during the cross-die test. Alloy 3 performed better in the cross-die stamping test than Alloy 2. Specifically, Alloy 3 provided a deep draw of 65 mm and Alloy 2 provided a deep draw of 55 mm.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A method of producing an aluminum alloy product, comprising:
    casting an aluminum alloy to produce a cast aluminum alloy article, wherein the aluminum alloy comprises 0.5 to 2.0 wt. % Si, 0.1 to 0.4 wt. % Fe, up to 0.4 wt. % Cu, up to 0.5 wt. % Mg, 0.02 to 0.1 wt. % Mn, up to 0.02 wt. % Cr, up to 0.15 wt. % Ti, up to 0.1 wt. % Zn, up to 0.15 wt. % impurities, and Al;
    homogenizing the cast aluminum alloy article to produce a homogenized cast aluminum alloy article;
    hot rolling the homogenized cast aluminum article to produce a hot rolled product, wherein the exit temperature of the hot rolled product ranges from 200° C. to 290° C.;
    cold rolling the hot rolled product in a first cold rolling step to produce a first cold rolled product having an intermediate gauge, wherein the first cold rolling step results in a thickness reduction from 25% to 70% from the hot rolled product to the first cold rolled product;
    inter-annealing the first cold rolled product at an inter-annealing temperature from 300° C. to 450° C.; and
    cold rolling the first cold rolled product in a second cold rolling step to produce a final gauge aluminum alloy product having a final gauge, wherein the second cold rolling step results in a thickness reduction from 40% to 70% from the intermediate gauge to the final gauge aluminum alloy product;
    wherein the final gauge aluminum alloy product comprises a volume fraction of alpha fibers of at least 8%, a volume fraction of beta fibers of at least 6%, and a ratio of the volume fraction of the alpha fibers to the volume fraction of the beta fibers ranging from 0.5:1 to 2:1.

2. The method of claim 1, wherein the intermediate gauge comprises a thickness ranging from 2 mm to 6 mm.

3. The method of claim 1, further comprising solution heat treating the final gauge aluminum alloy product.

4. The method of claim 1, wherein the final gauge comprises a thickness ranging from 0.1 mm to 3 mm.

5. The method of claim 1, wherein the casting step comprises direct chill casting or continuous casting.

6. The method of claim 1, wherein the homogenizing step is performed at a homogenization temperature of from 450° C. to 600° C.

7. The method of claim 1, wherein the hot rolling step is performed at a hot rolling temperature of from 500° C. to 560° C.

8. The method of claim 1, wherein the final gauge aluminum alloy product exhibits a yield strength of at least 5% greater than a yield strength of a 6xxx series aluminum alloy prepared by a method including a final cold rolling step that results in a greater than 70% reduction in thickness from the intermediate gauge aluminum alloy to the final gauge aluminum alloy.

9. The method of claim 1, wherein the final gauge aluminum alloy product exhibits an ultimate tensile strength of at least 3% greater than an ultimate tensile strength of a 6xxx series aluminum alloy prepared by a method including a final cold rolling step that results in a greater than 70% reduction in thickness from the intermediate gauge aluminum alloy to the final gauge aluminum alloy.

10. The method of claim 1, wherein the final gauge aluminum alloy product has a total elongation of at least 5% greater than a total elongation of a 6xxx series aluminum alloy prepared by a method including a final cold rolling step that results in a greater than 70% reduction in thickness from the intermediate gauge aluminum alloy to the final gauge aluminum alloy.

* * * * *